United States Patent
Oda et al.

(10) Patent No.: US 7,605,863 B2
(45) Date of Patent: Oct. 20, 2009

(54) IMAGE PICK-UP DEVICE INCLUDING CAMERA ANGLED WITH RESPECT TO A DISPLAY DEVICE

(75) Inventors: Hirofumi Oda, Higashihiroshima (JP); Kimiaki Imai, Higashihiroshima (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 783 days.

(21) Appl. No.: 10/791,786

(22) Filed: Mar. 4, 2004

(65) Prior Publication Data
US 2004/0239808 A1 Dec. 2, 2004

(30) Foreign Application Priority Data
May 26, 2003 (JP) .............................. 2003-147669

(51) Int. Cl.
H04N 5/225 (2006.01)
H04M 1/00 (2006.01)
(52) U.S. Cl. .................................. 348/373; 455/575.3
(58) Field of Classification Search ............. 348/14.16, 348/373–376; 455/575.1–575.9
See application file for complete search history.

(56) References Cited

U.S. PATENT DOCUMENTS

| | | | | |
|---|---|---|---|---|
| 5,903,706 | A * | 5/1999 | Wakabayashi et al. | 348/373 |
| 6,259,470 | B1 * | 7/2001 | Koizumi et al. | 348/14.1 |
| 6,323,902 | B1 * | 11/2001 | Ishikawa | 348/373 |
| 6,518,993 | B2 * | 2/2003 | Kerai et al. | 348/376 |
| 6,812,958 | B1 * | 11/2004 | Silvester | 348/375 |
| 6,900,843 | B1 * | 5/2005 | Uchiyama | 348/374 |
| 7,173,665 | B2 * | 2/2007 | Kawasaki et al. | 348/376 |
| 7,283,854 | B2 * | 10/2007 | Sato et al. | 455/575.3 |
| 2002/0065102 | A1 | 5/2002 | Miyake et al. | |
| 2003/0036365 | A1 * | 2/2003 | Kuroda | 455/90 |
| 2003/0125080 | A1 * | 7/2003 | Shimamura | 348/376 |
| 2004/0017479 | A1 * | 1/2004 | Nakakubo et al. | 348/207.99 |
| 2004/0080667 | A1 * | 4/2004 | Jeong et al. | 348/374 |
| 2004/0090552 | A1 * | 5/2004 | Watanabe et al. | 348/373 |
| 2004/0130658 | A1 * | 7/2004 | Yamaguchi et al. | 348/375 |
| 2005/0146621 | A1 | 7/2005 | Tanaka et al. | |

FOREIGN PATENT DOCUMENTS

AU       B-48966/93       5/1994

(Continued)

OTHER PUBLICATIONS

Whybray, M.W. et al. "Videophony", Bristish Telecom Technology Journal, vol. 8, No. 3, pp. 43-54, XP 000601061, London, GB, Jul. 1, 1990.

*Primary Examiner*—Timothy J Henn
(74) *Attorney, Agent, or Firm*—Birch, Stewart, Kolasch & Birch, LLP

(57) ABSTRACT

A camera-equipped portable device has first and second bodies, a camera for taking a picture, and a main display portion displaying the taken picture. The camera and the main display portion are arranged on the same surface of first body, and the camera is fixed to the first body such that an optical axis of the camera extends in a direction different from a direction perpendicular to a display surface of the main display portion. Thereby, it is possible to provide an image pick-up device, which allows picture-taking in a natural position, can suppress increase in product cost and can have a compact structure.

16 Claims, 26 Drawing Sheets

FOREIGN PATENT DOCUMENTS

| | | |
|---|---|---|
| CA | 2107415 A1 | 5/1994 |
| EP | 0 595 049 A1 | 5/1994 |
| EP | 1 246 464 A2 | 10/2002 |
| JP | 06-225298 | 8/1994 |
| JP | 11-95865 A | 4/1999 |
| JP | 2002-111835 A | 4/2002 |
| JP | 2002-171322 A | 6/2002 |
| JP | 2002-185589 A | 6/2002 |
| JP | 2002-290793 A | 10/2002 |
| JP | 2002-300454 | 10/2002 |
| JP | 2002-300550 A | 10/2002 |
| JP | 2003-060765 | 2/2003 |
| JP | 2003051872 A * | 2/2003 |
| WO | WO-03/024094 A1 | 3/2003 |
| WO | WO 03/039110 A1 | 5/2003 |

* cited by examiner

FIG.1A
FIG.1B
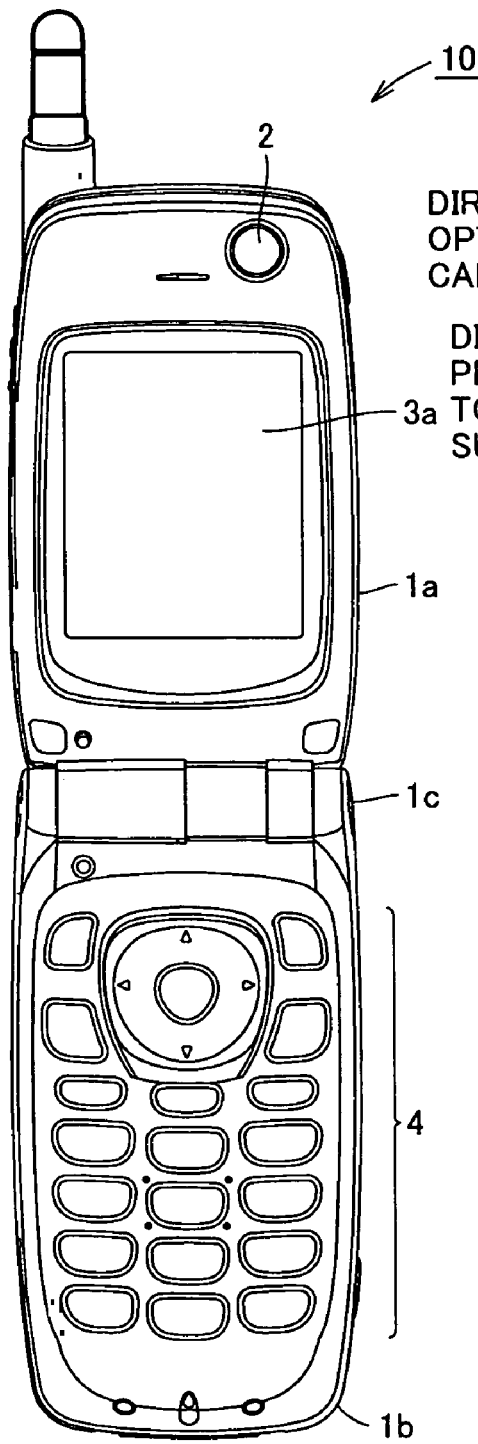
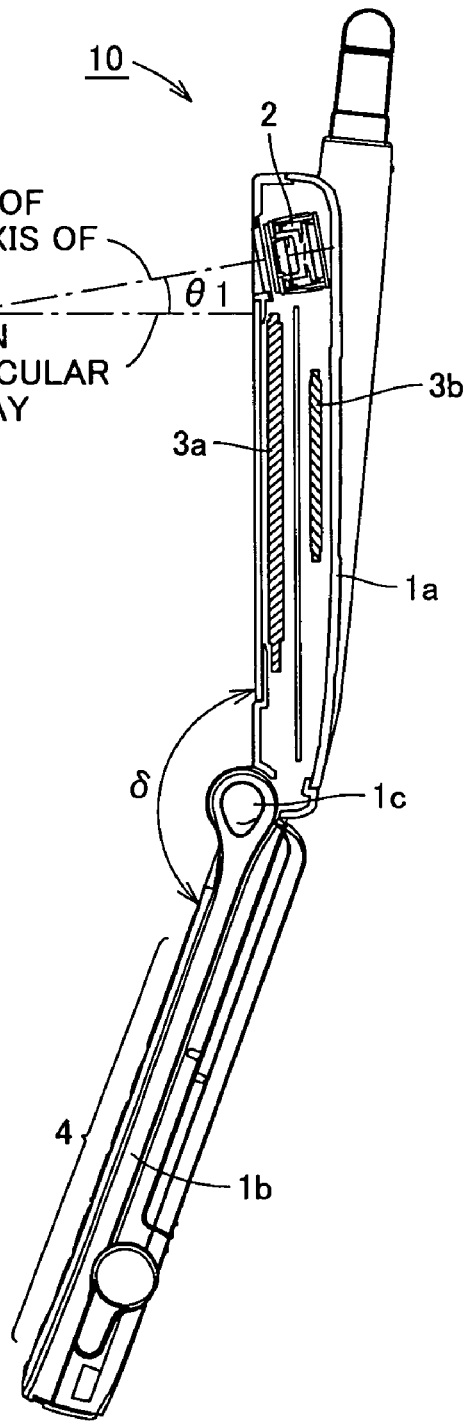

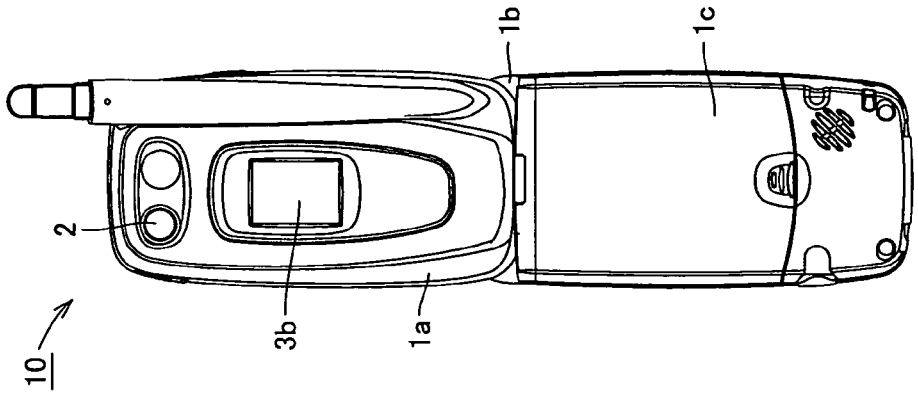
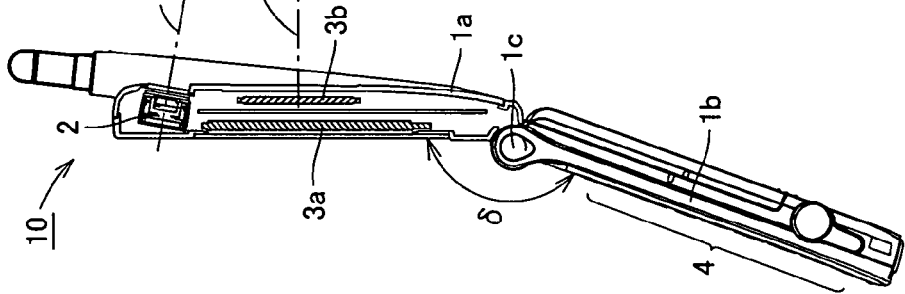
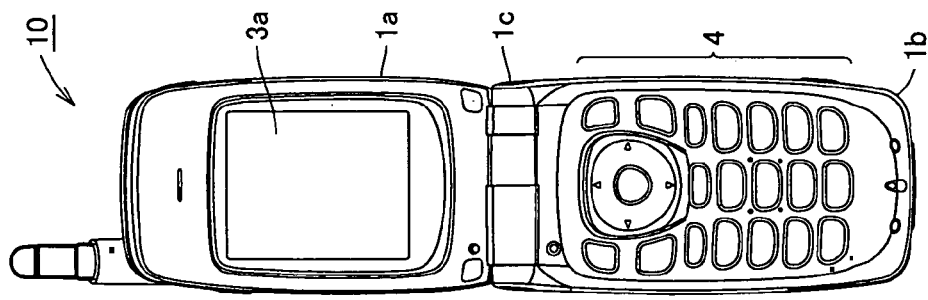

DIRECTION OF OPTICAL AXIS OF CAMERA

FIG.11A
FIG.11B
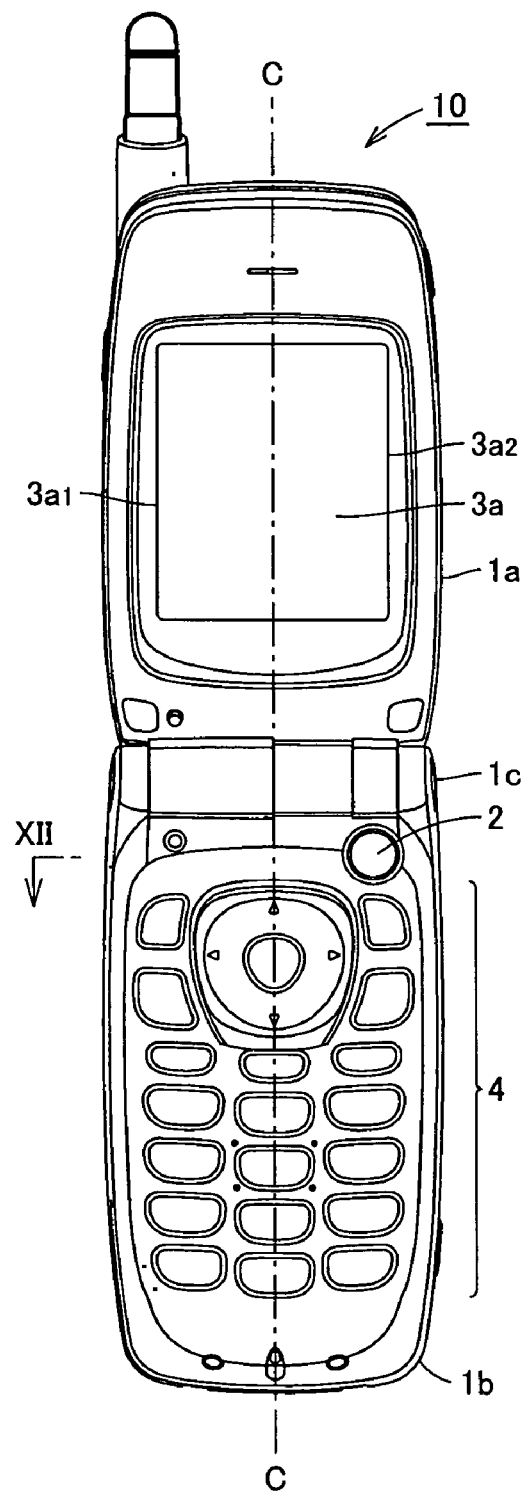
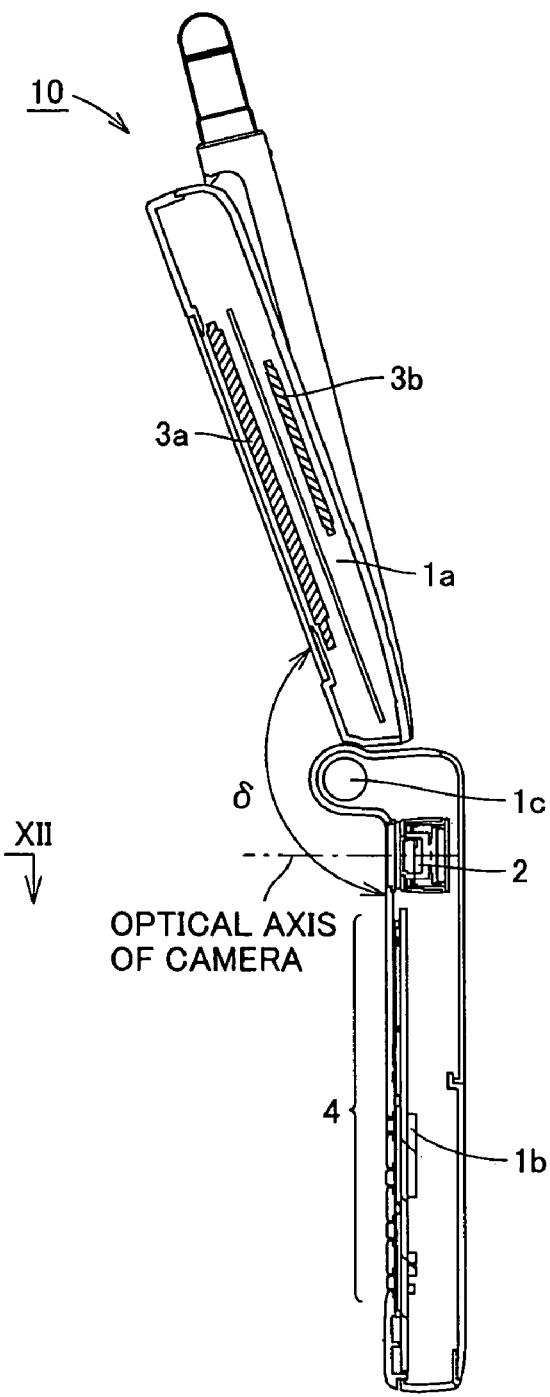

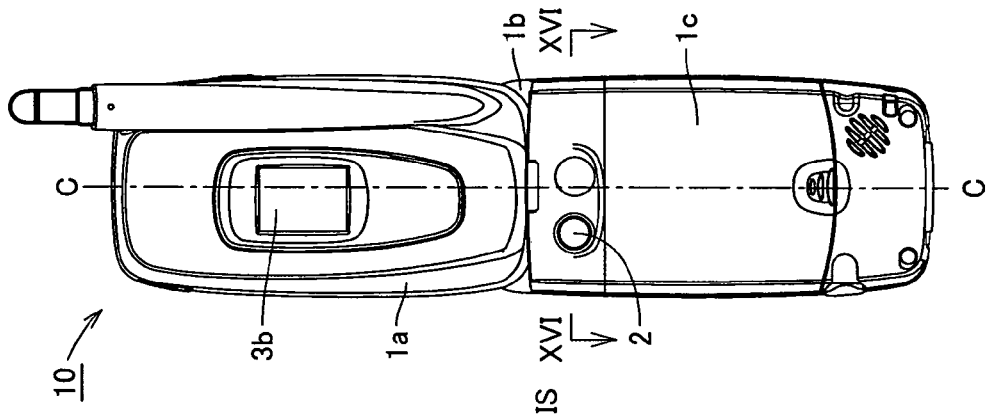
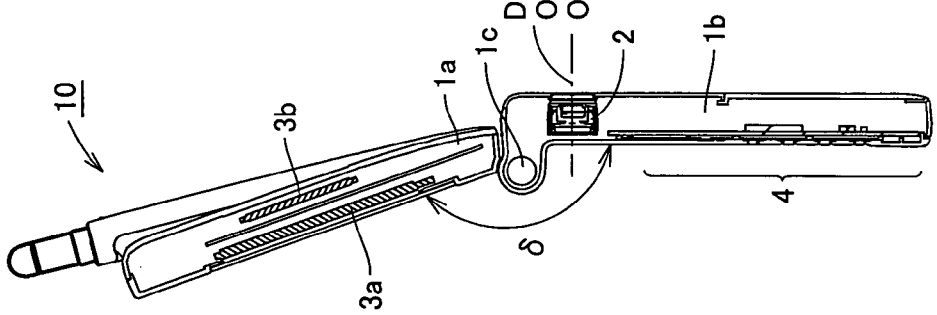
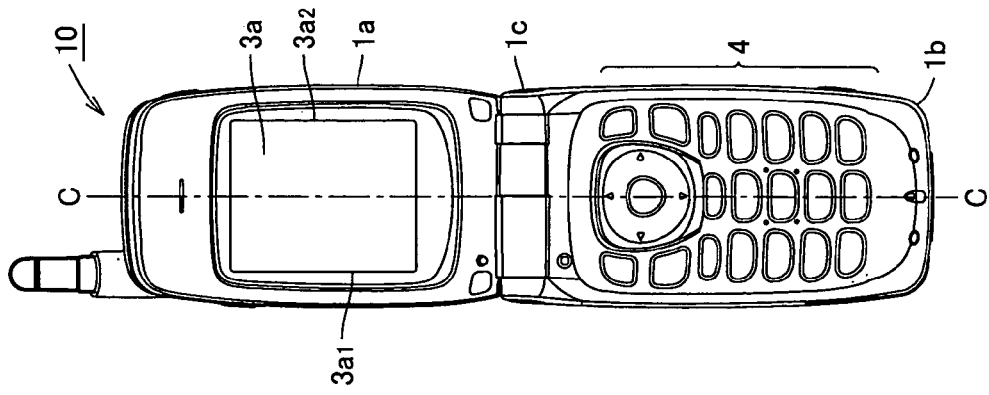

DIRECTION OF OPTICAL AXIS OF CAMERA

FIG.19A
FIG.19B
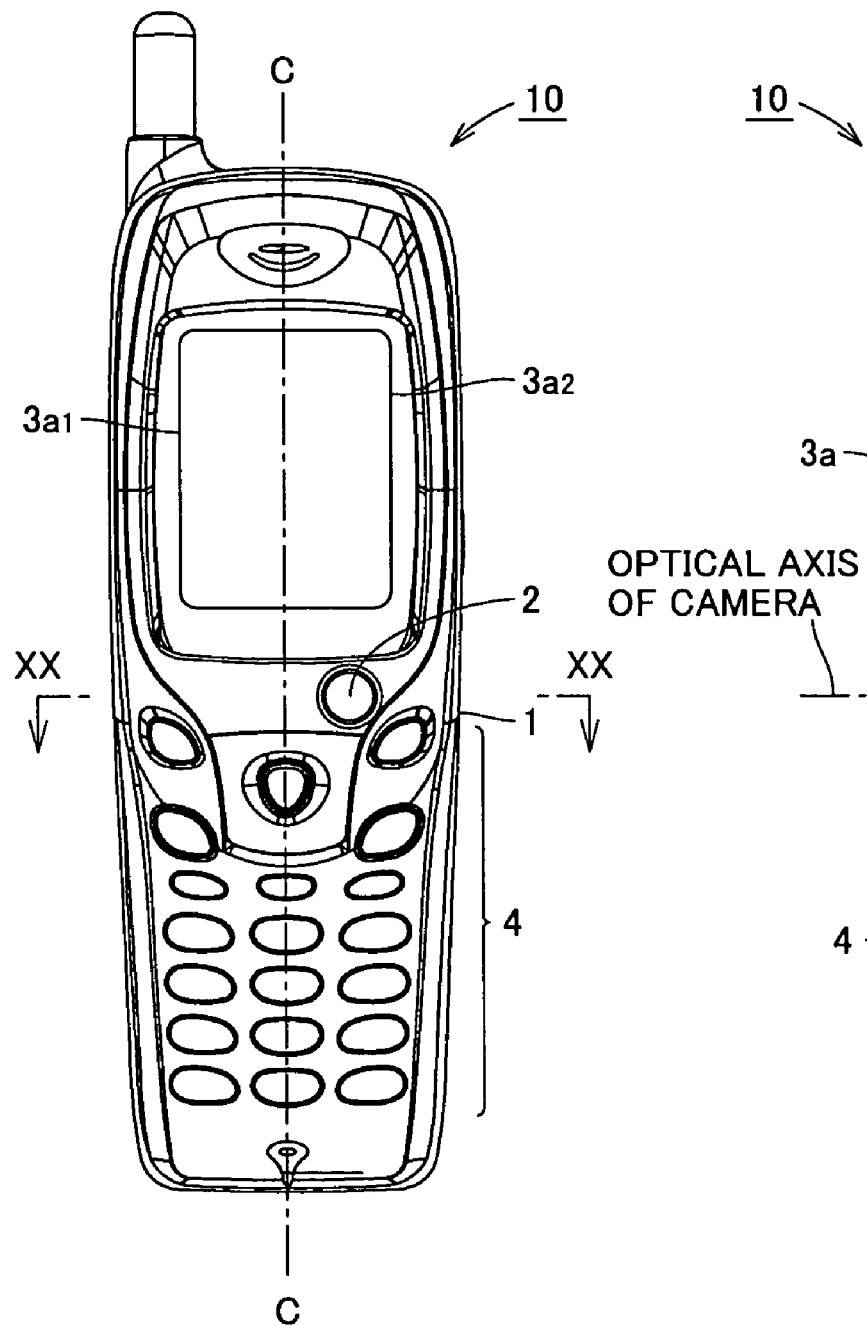
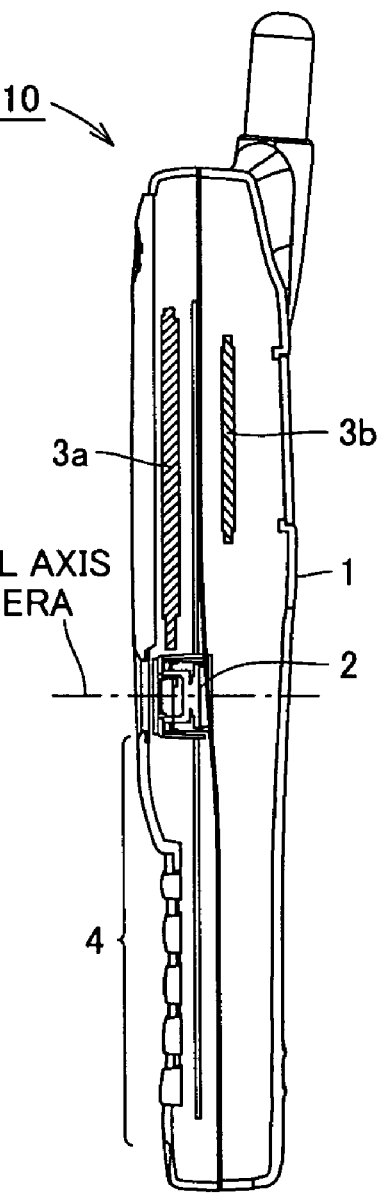

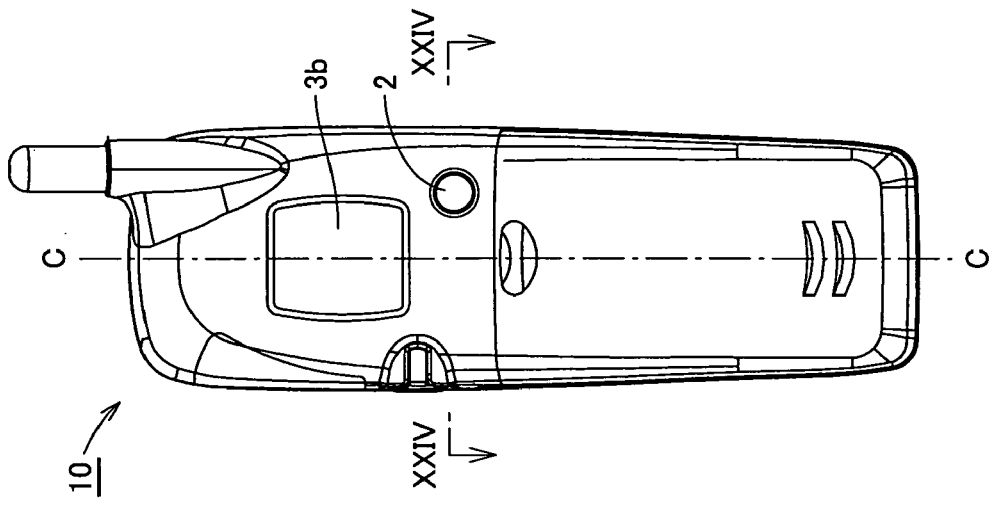
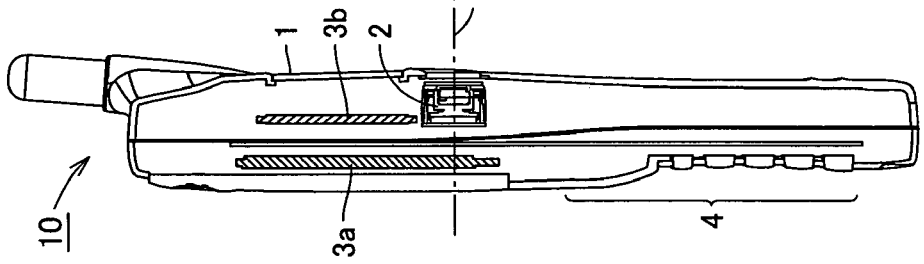
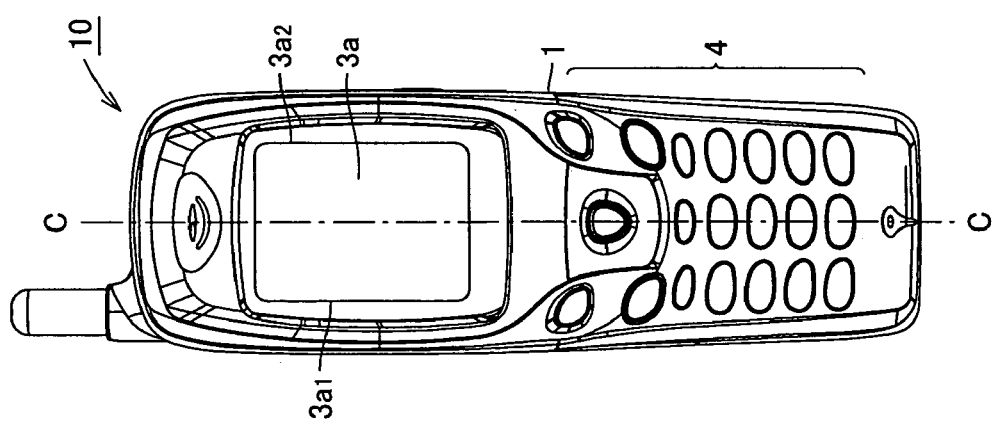

FIG.25A
FIG.25B
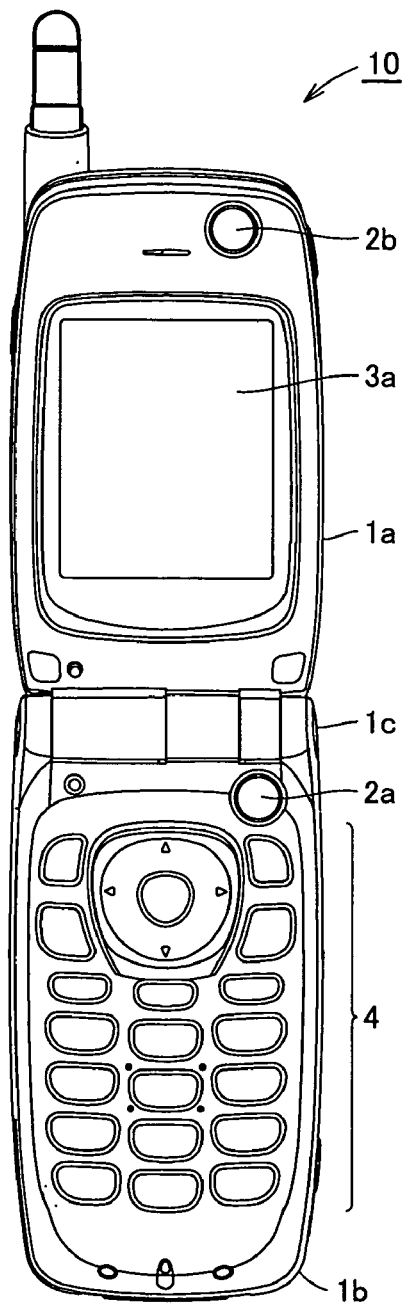
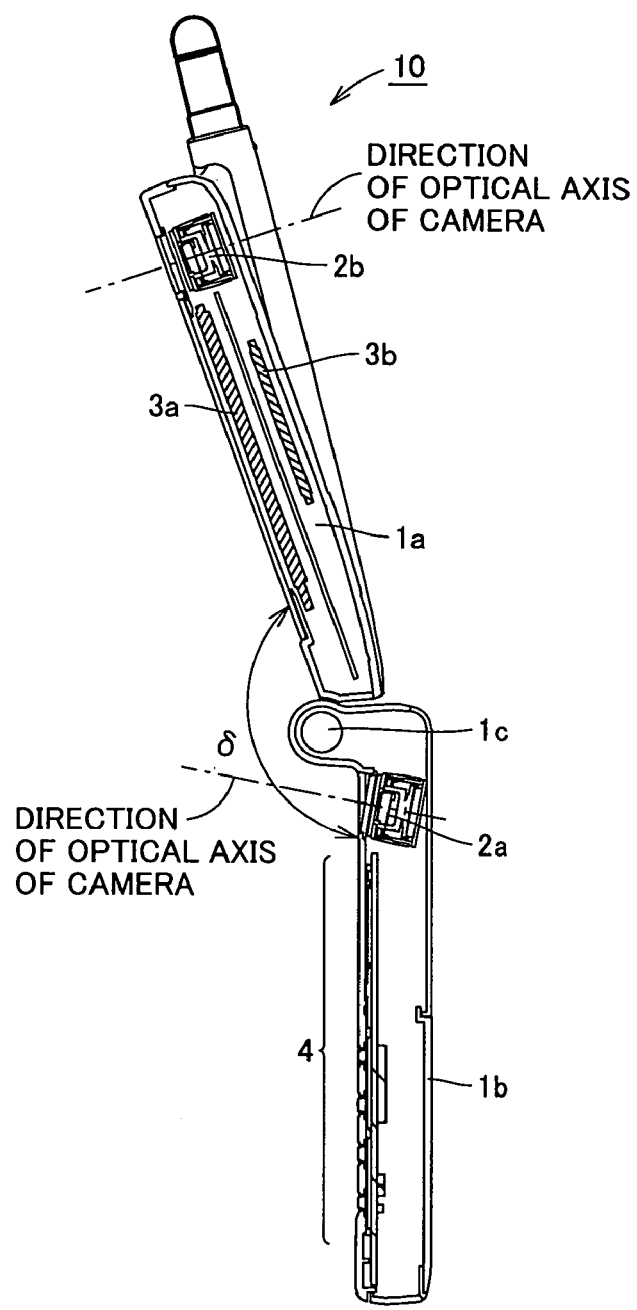

IMAGE PICK-UP DEVICE INCLUDING CAMERA ANGLED WITH RESPECT TO A DISPLAY DEVICE

This nonprofitional application is based on Japanese Patent Application No. 2003-147669 filed with the Japan Patent Office on May 26, 2003, the entire contents of which are hereby incorporated by reference.

BACKGROUND OF THE INVENTION

1. Field of the Invention

The present invention relates to an image pick-up device, and particularly to an image pick-up device provided with a display portion displaying taken pictures.

2. Description of the Background Art

There have been proposed many kinds of portable communication devices, which are provided with cameras, and can transmit pictures taken by the cameras.

For example, Japanese Patent Laying-Open No. 2002-290793 has disclosed a structure, in which an image pick-up lens and an image display portion are arranged on the same plane so that an operator can see a picture of a party or a person at the other end of the line while taking an operator's own picture, and also can check a sight via a finder when taking a picture of a far subject.

Japanese Patent Laying-Open No. 2002-111835 has disclosed a structure, in which a main body is formed of first and second bodies, and a camera is rotatably arranged at an end of the second body so that an operator can rotate the camera to a position, in which the operator can take a picture of a subject on the rear side of a liquid crystal display portion while viewing a screen of the liquid crystal display portion.

Japanese Patent Laying-Open No. 2002-185589 has disclosed a structure, in which a camera can be turned away from an externally exposed position when an operator uses a cellular phone for only usual conversation, and thereby smear and damage of a lens due to direction contact with a face or an ear of the operator.

Japanese Patent Laying-Open No. 11-95865 has disclosed an electronic device taking a form of a notebook computer. In this device, an optical axis of a camera attached to an upper portion of a display panel can always be kept horizontal even when an inclination angle of the display panel is changed.

According to Japanese Patent Laying-Open No. 2002-290793, the optical axis of the camera is substantially perpendicular to a surface of the body carrying the camera. Therefore, for viewing an image of the party at the other end of the line when taking an operator's own picture, the operator must keep the camera at a high position aligned to the operator's eyes (i.e., at a position on a line of vision or sight of the operator) for taking the picture, and further, must keep the display screen perpendicular to the line of vision of the operator so that the operator takes an unnatural posture.

Each of the structures disclosed in Japanese Patent Laying-Open Nos. 2002-111835, 2002-185589 and 11-95865 is devised so that the camera may be rotatable. This overcomes the foregoing problem relating to the unnatural posture. However, a rotary structure or mechanism for the camera increases the numbers of parts and assembly steps so that a product cost increases. Also, the rotary mechanism increases an occupied space so that it is difficult to achieve a compact structure of the product.

SUMMARY OF THE INVENTION

The invention has been developed in view of the above, and it is a feature of the invention to provide an image pick-up device, which can suppress a product cost, and can easily achieve a compact structure of the product.

An image pick-up device according to the invention includes a main body, a camera for taking a picture, and a display device displaying a taken picture and arranged at a surface of the main body on the same side as the camera. The camera is fixed to the main body such that an optical axis of the camera extends in a direction different from a direction perpendicular to a display surface of the display device.

According to the image pick-up device of the invention, since the direction of the optical axis of the camera is different from the direction perpendicular to the display surface of the display device, it is not necessary to keep the display surface perpendicular to a line of vision of an operator when the operator takes an operator's own picture by the camera. In particular, even when the operator directs the operator's face straightly forward, it is not necessary to keep the main body vertical (i.e., perpendicular to the ground surface), and the operator can keep the main body in such an inclined easy position that a lower portion of the display surface or screen is shifted toward the operator with respect to its upper portion, when the operator takes the operator's own picture by the camera while checking or viewing the operator's own picture on the display screen.

Since the camera is fixed to the main body such that the direction of the optical axis of the camera is different from the direction perpendicular to the display surface, a rotary mechanism for rotating the camera is not required for inclining the direction of the optical axis of the camera with respect to the direction perpendicular to the display surface. Therefore, it is possible to prevent increase in cost of a product due to increase in numbers of parts and assembly steps of the rotary mechanism, and the image pick-up device can have a compact structure.

Optionally, in the image pick-up device described above, the camera may be arranged on one side of the vertically opposite sides of the display device, and the optical axis of the camera is inclined toward the other side.

According to the above structure, when the optical axis of the camera is directed toward a front of an operator's face, the display device is inclined to shift its lower portion toward the operator, and the operator can keep the display portion in the inclined easy position when viewing it.

Optionally, in the image pick-up device described above, the camera may be arranged on one side of the laterally opposite sides of the display device, and the optical axis of the camera is inclined toward the other side.

According to the above structure, the operator can turn the image pick-up device 90 degrees clockwise or counterclockwise to locate the device in a horizontal or landscape position while viewing the display screen. Thereby, it is not necessary to keep the display surface perpendicular to the line of operator's vision when the operator takes an operator's own picture by the camera. Therefore, the operator can take an easy position when the operator takes the operator's own image by the camera in the horizontal position while checking the operator's own image on the display screen.

Optionally, in the image pick-up device described above, the display device is a main display portion arranged on one of opposite surfaces of the main body. The image pick-up device further includes a sub-display portion arranged on the other surface of the main body. The camera and the main display portion are arranged on the one of the opposite surfaces of the main body.

Thereby, the operator can take an easy position when taking the operator's own image by the camera while checking the operator's own image on the display screen of the main display portion.

Optionally, the image pick-up device described above further includes a main display portion arranged on one of opposite surfaces of the main body. The display device is a sub-display portion arranged on the other surface of the main body, and the camera and the sub-display portion are arranged on the other surface of the main body.

Thereby, the operator can take an easy position when taking the operator's own image by the camera while checking the operator's own image on the display screen of the sub-display portion.

Optionally, in the image pick-up device described above, the main body has a structure of first and second bodies foldably coupled together, and the camera and the display device are arranged on the first body.

Thereby, the image pick-up device of the foldable type can be operated so that the operator can take an easy position when taking the operator's own image by the camera while checking the operator's own image on the display screen.

Optionally, in the image pick-up device described above, the main body has a structure formed of first and second bodies foldably coupled together, the display device is arranged on the first body, and the camera is arranged on the second body.

Thereby, the image pick-up device of the foldable type can be operated so that the operator can take an easy position when taking the operator's own image by the camera while checking the operator's own image on the display screen.

Optionally, in the image pick-up device described above, the main body has a structure formed of a single body.

Thereby, the image pick-up device of a straight type having the single body can be operated so that the operator can take an easy position when taking the operator's own image by the camera while checking the operator's own image on the display screen.

Optionally, the image pick-up device described above further includes an additional camera arranged on the main body, the main body has a structure formed of first and second bodies foldably coupled together, the camera is arranged on one of the first and second bodies, and the additional camera is arranged on the other of the first and second bodies.

Since the two cameras are employed, the operator can select the cameras for operation in an easier position when taking the operator's own image while viewing the display screen. In at least one of the vertical (portrait) position and the horizontal (landscape) position of image pick-up device, the operator can take an easy position when taking the operator's own image by the camera while viewing the display screen.

Optionally, the image pick-up device described above further includes an additional camera arranged on the main body, the main body has a structure formed of first and second bodies foldably coupled together, the camera and the additional camera are arranged on one of the first and second bodies.

Since the two cameras are employed, the operator can select the cameras for operation in an easier position when taking the operator's own image while viewing the display screen. In at least one of the vertical position and the horizontal position of image pick-up device, the operator can take an easy position when taking the operator's own image by the camera while viewing the display screen.

Optionally, in the image pick-up device described above, the camera and the additional camera are arranged on the different surfaces of one of the first and second bodies, respectively.

Optionally, in the image pick-up device described above, the additional camera has an optical axis perpendicular to the display surface of the display device, and the camera has an optical axis in a direction different from a direction perpendicular to the display surface of the display device.

Optionally, in the image pick-up device described above, the camera and the additional camera are both arranged on the same side of the one of the bodies.

Optionally, in the image pick-up device described above, one of the camera and the additional camera is arranged on the one of the vertically opposite sides of the display device, and has an optical axis inclined toward the other side of the vertically opposite sides. The other of the camera and the additional camera is arranged on the one of the laterally opposite sides of the display device, and has an optical axis inclined toward the other side of the laterally opposite sides.

Thereby, in at least one of the vertical position and the horizontal position of image pick-up device, the operator can take an easy position when taking the operator's own image by the camera while viewing the display screen.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 1A and 1B are a front view and a side view (with only certain parts of a first body cut away) schematically showing an image pick-up device of a first embodiment of the invention, and particularly showing, by way of example, a structure of a camera-equipped portable device, respectively.

FIGS. 5A, 5B and 5C are a front view, a side view (with only certain parts of a first body cut away) and a rear view schematically showing an image pick-up device of a third embodiment of the invention, and particularly showing, by way of example, a structure of a camera-equipped portable device, respectively.

FIGS. 11A and 11B are a front view and a cross section schematically showing an image pick-up device of a sixth embodiment of the invention, and particularly showing, by way of example, a structure of a camera-equipped portable device, respectively.

FIGS. 15A, 15B and 15C are a front view, a cross section and a rear view schematically showing an image pick-up device of an eighth embodiment of the invention, and particularly showing, by way of example, a structure of a camera-equipped portable device, respectively.

FIGS. 19A and 19B are a front view and a cross section schematically showing an image pick-up device of a tenth embodiment of the invention, and particularly showing, by way of example, a structure of a camera-equipped portable device, respectively.

FIGS. 23A, 23B and 23C are a front view, a cross section and a rear view schematically showing an image pick-up device of a twelfth embodiment of the invention, and particularly showing, by way of example, a structure of a camera-equipped portable device, respectively.

FIGS. 25A and 25B are a front view and a cross section schematically showing an image pick-up device of a thirteenth embodiment of the invention, and particularly showing, by way of example, a structure of a camera-equipped portable device, respectively.

DESCRIPTION OF THE PREFERRED EMBODIMENTS

Embodiments of the invention will now be described with reference to the drawings.

First Embodiment

Figure 2:
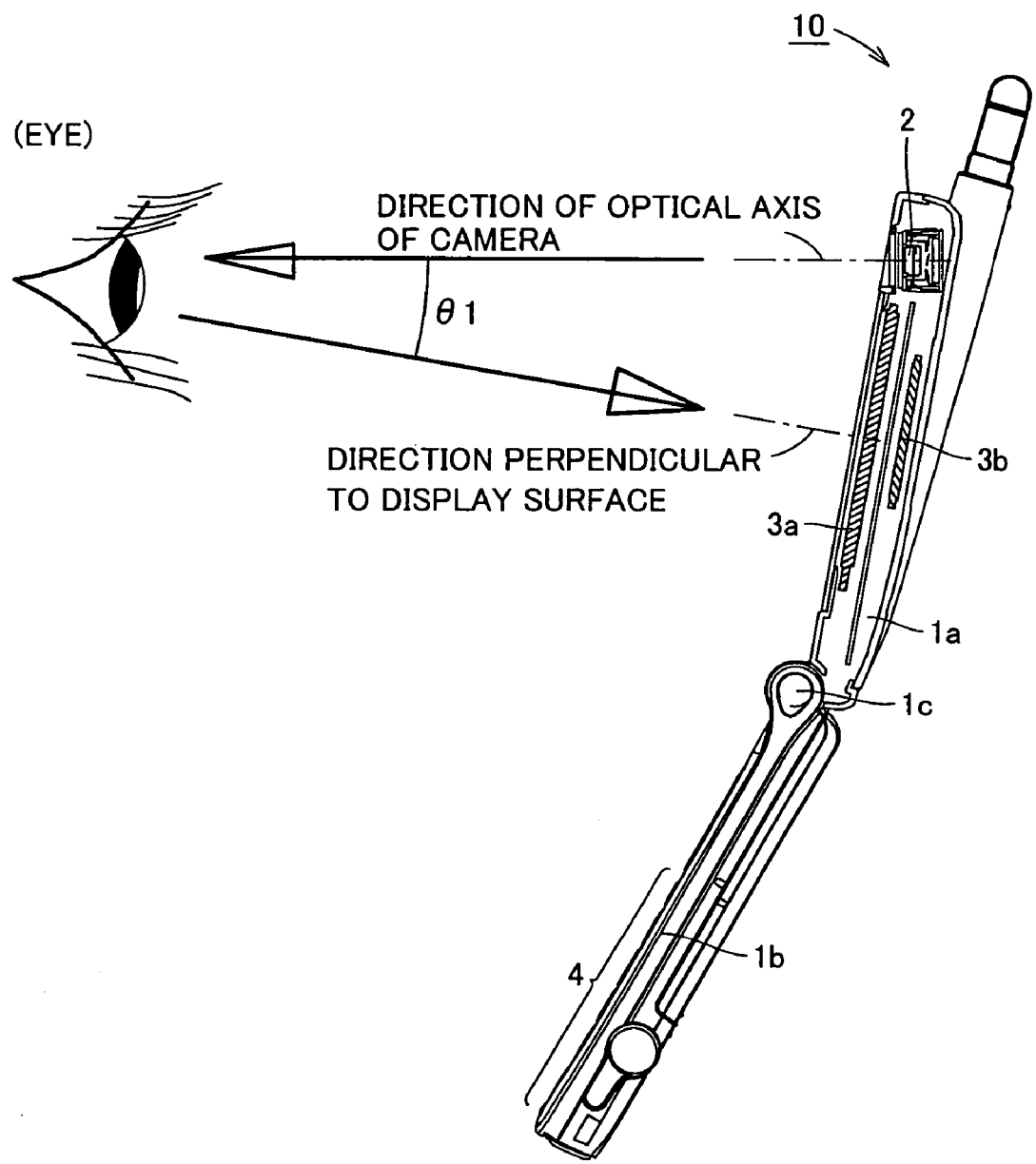
FIG. 2 shows a positional relationship between a display portion of the camera-equipped portable device shown in FIGS. 1A and 1B and an eye of an operator of the camera.

Referring to FIGS. 1A, 1B and 2, a camera-equipped portable device 10 of a first embodiment is of a foldable type, and primarily includes a first body 1a, a second body 1b, a hinge portion 1c, a camera 2, a main display portion 3a, a sub-display portion 3b and a plurality of input buttons 4.

First and second bodies 1a and 1b are foldably coupled together by hinge portion 1C. First body 1a is provided on one of its opposite surfaces (i.e., on front surface) with camera 2 for taking pictures and main display portion 3a displaying the taken pictures, and is also provided on the other surface (i.e., rear surface) with sub-display portion 3b. The plurality of buttons 4 are arranged on a surface of second body 1b. When first and second bodies 1a and 1b are folded to attain a closed state, camera 2, main display portion 3a and the plurality of input buttons 4 are located on the inner side, and sub-display portion 3b is located on the outer side. In the folded state, therefore, an operator can view sub-display portion 3b on the outer side of camera-equipped portable device 10, and cannot view camera 2, main display portion 3a and the plurality of input buttons 4. When first and second bodies 1a and 1b are in the open state, first and second bodies 1a and 1b form an angle δ1 of about 160 degrees.

Camera 2 is fixed to first body 1a such that an optical axis of camera 2 extends in a direction different from a direction perpendicular to a display screen or surface of main display portion 3a. The optical axis of camera 2 is inclined toward second body 1b or hinge portion 1c with respect to the direction perpendicular to the display surface of main display portion 3a. More specifically, camera 2 is arranged on one (upper side in FIGS. 1A and 1B) of the vertically opposite sides of main display portion 3a in FIGS. 1A and 1B, and the optical axis of camera 2 is inclined toward the other side (lower side in FIGS. 1A and 1B). In the specification, the inclination of the optical axis of camera 2 toward the other side means that a position on the optical axis of camera 2 changes toward the other side as the position moves away from camera 2.

The optical axis of camera 2 forms an angle θ1 from 5 to 10 degrees with respect to the normal to the display surface (i.e., to the direction perpendicular to the display surface) of main display portion 3a. Thus, the optical axis of camera 2 is inclined by angle θ1 from 5 to 10 degrees with respect to the normal to the display surface of main display portion 3a toward second body 1b or hinge portion 1c.

According to the embodiment, since camera 2 is fixed to first body 1a to keep the fixed inclination of angle θ1 with respect to first body 1a, it is not necessary to keep the display surface perpendicular to a line of operator's vision when the operator takes the operator's own picture. In particular, even when the operator directs his/her face straightly forward, it is not necessary to keep first body 1a vertical (i.e., perpendicular to the ground surface), and the operator can incline first body 1a by shifting the upper portion of main display portion 3a toward the operator with respect to the lower portion. This inclined position is easy for the operator because the operator can lower the operator's arm. In this easy position, the operator can take the operator's own picture while checking or viewing the operator's own image on main display portion 3a.

Since camera 2 is fixed to first body 1a such that the optical axis of camera 2 extends in a direction different from the direction perpendicular to the display surface of main display portion 3a, it is not necessary to provide a camera-rotating mechanism for inclining the optical axis of camera 2 with respect to the normal to the display surface of main display portion. Therefore, it is possible to prevent increase in numbers of parts and assembly steps of the rotating mechanism, and thus to prevent increase in cost of a product. Also, it is possible to achieve a compact structure of the product.

If angle θ1 is smaller than 5 degrees, it may be difficult to achieve sufficiently the effect intended to be achieved by inclining the optical axis of camera 2 with respect to the normal to the display surface. If angle θ1 exceeds 10 degrees, the optical axis of camera 2 intersects the normal to the display surface of main display portion 3a at a position closer to camera 2 so that possibly the operator's face may protrude from a frame of a main display portion 3a when the operator takes the operator's own picture while viewing main display portion 3a.

Second Embodiment

Figure 3A:
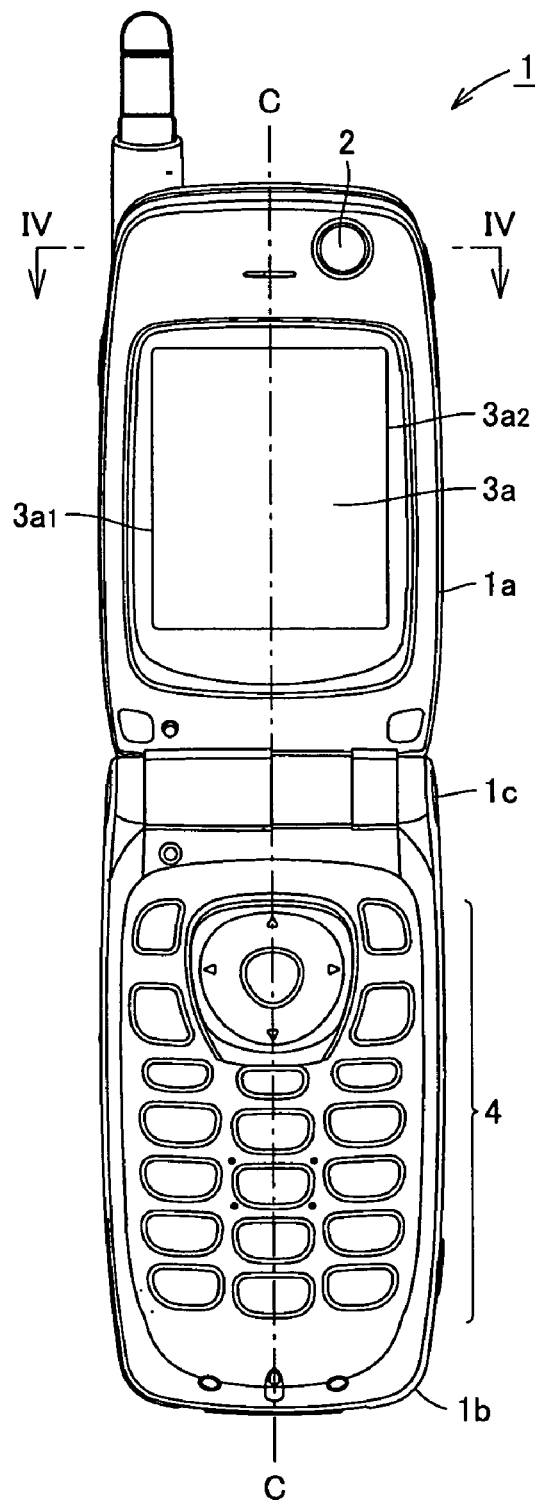
FIGS. 3A and 3B are a front view and a side view (with only certain parts of a first body cut away) schematically showing an image pick-up device of a second embodiment of the invention, and particularly showing, by way of example, a structure of a camera-equipped portable device, respectively.
Figure 3B:
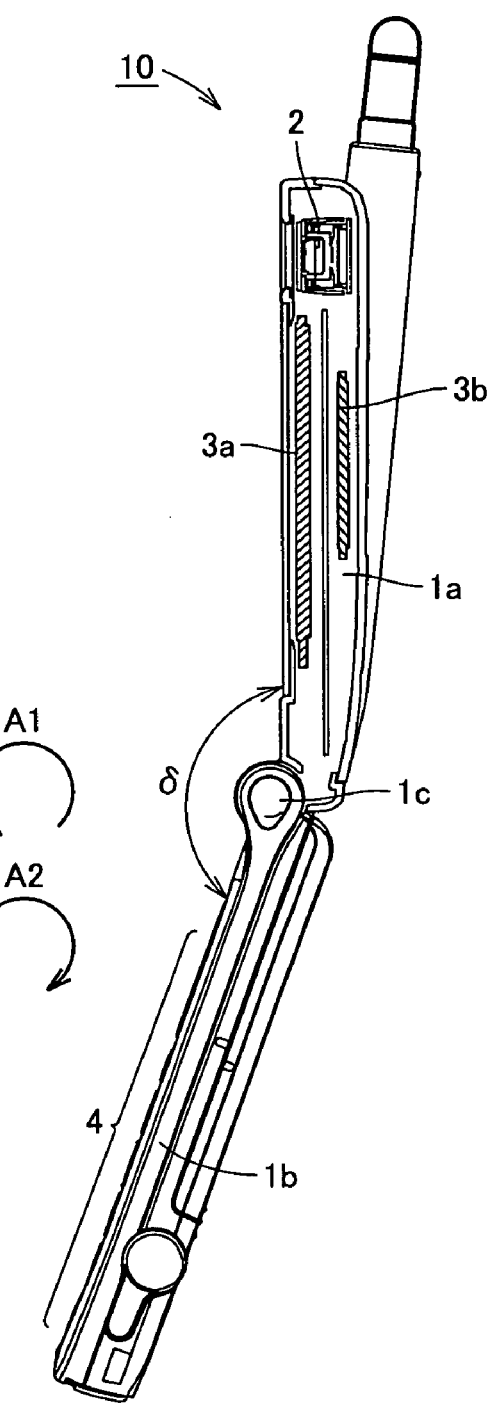
Figure 4:
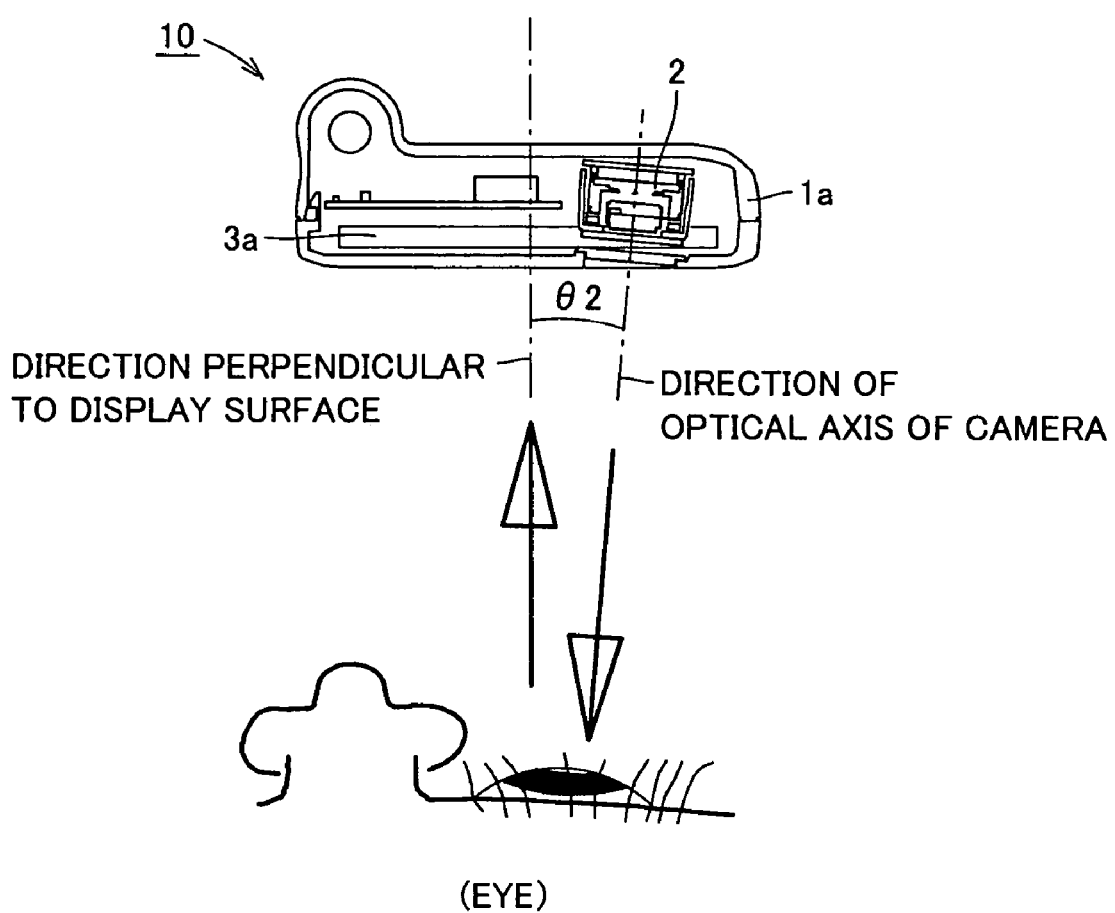
FIG. 4 is a cross section taken along line IV-IV in FIG. 3A, and shows a positional relationship between a display portion of the camera-equipped portable device shown in FIGS. 3A and 3B and an eye of an operator of the camera.
Figure 6:
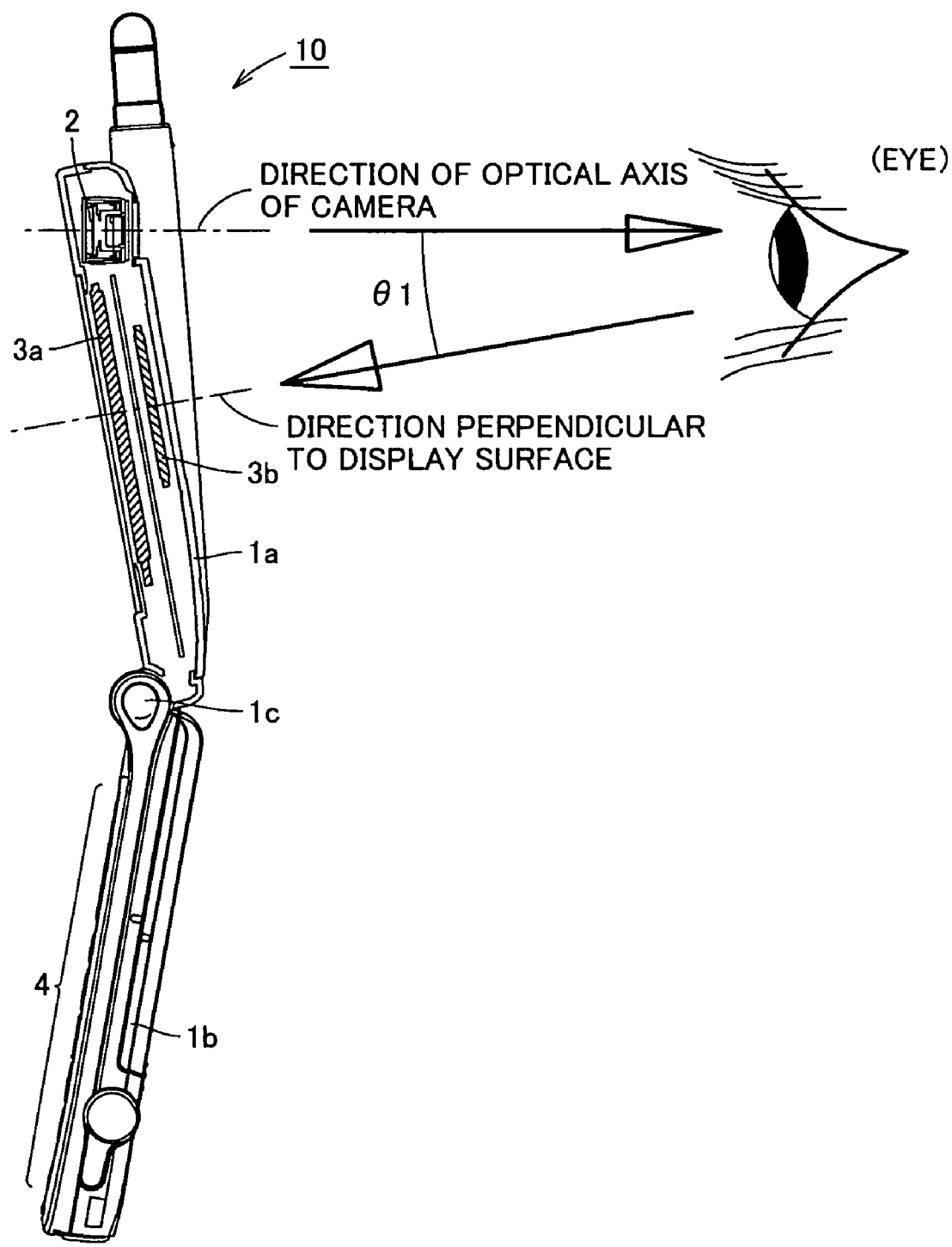
FIG. 6 is a view with only certain parts of a first body cut away, and shows a positional relationship between a display portion of the camera-equipped portable device shown in FIGS. 5A, 5B and 5C.

Referring to FIGS. 3A, 3B and 4, a structure of camera-equipped portable device 10 of a second embodiment differs from the structure of the first embodiment in the inclination direction of the optical axis of camera 2.

Camera 2 is fixed to first body 1a such that the optical axis of camera 2 is inclined toward a center line C-C of camera-equipped portable device 10. More specifically, camera 2 is arranged on one (right side in FIG. 3A) of the laterally opposite sides (left and right sides in FIG. 3A) of main display portion 3a, and the optical axis of camera 2 is inclined toward the other side. In the specification, center line C-C of camera-equipped portable device 10 represents a line substantially passing through a center of a short side perpendicular to a long side direction, in which main display portion 3a is aligned to the plurality of input buttons 4.

More specifically, if camera 2 is located to the right of center line C-C as shown in FIG. 3A, the optical axis of camera 2 is inclined toward the left (i.e., toward center line C-C) as shown in FIG. 4. If camera 2 is located to the left of center line C-C in FIG. 3A, the optical axis of camera 2 is inclined toward the right in FIG. 4 (i.e., toward center line C-C).

The optical axis of camera 2 and the normal to the display surface of main display portion 3a form an angle θ2 from 5 to 10 degrees. Thus, the optical axis of camera 2 is inclined toward center line C-C with respect to the normal to the display surface of main display portion 3a at angle θ2 from 5 to 10 degrees.

Structures other than the above are substantially the same as those of the first embodiment already described. The same components bear the same reference numbers, and description thereof is not repeated.

According to the second embodiment, the optical axis of camera 2 is inclined toward center line C-C. Therefore, when the operator keeps the camera-equipped portable device 10 in a horizontal or landscape position by rotating it 90 degrees counterclockwise as indicated by an arrow A1 from the position shown in FIG. 3A, or by rotating it 90 degrees clockwise as indicated by an arrow A2, the operator can take the operator's own picture by camera 2 without keeping the display surface of main display portion 3a perpendicular to the line of operator's vision. In particular, even when the operator directs his/her face straightly forward, it is not necessary to keep first body 1a vertical (perpendicular to the ground surface), and the operator can incline first body 1a by shifting the upper portion of main display portion 3a toward the operator with respect to the lower portion. This inclined position is easy for the operator because the operator can lower the operator's arm. In this easy position, the operator can take the operator's own picture while checking the operator's own image on main display portion 3a.

More specifically, if camera 2 is arranged to the right of center line C-C as shown in FIG. 3A, camera-equipped portable device 10 is rotated 90 degrees counterclockwise to attain a horizontal position as indicated by arrow A1. Thereby, the operator can keep portable device 10 in an inclined easy position such that a lower end $3a_1$ of main display portion 3a is shifted toward the operator. In this easy position, the operator can take the operator's own picture by camera 2 while checking the operator's own image on main display portion 3a.

Although not shown, if camera 2 is arranged to the left of center line C-C in FIG. 3A, camera-equipped portable device 10 is rotated 90 degrees clockwise to attain a horizontal position as indicated by arrow A2. Thereby, the operator can keep portable device 10 in an inclined easy position such that a lower end $3a_2$ of main display portion 3a is shifted toward the operator. In this easy position, the operator can take the operator's own picture by camera 2 while checking the operator's own image on main display portion 3a.

Third Embodiment

Referring to FIGS. 5A, 5B, 5C and 6, a structure of camera-equipped portable device 10 according to a third embodiment differs from the structure of the first embodiment in that camera 2 is not arranged on the one surface (front surface) of first body 1a, but is arranged on the other surface (rear surface) of first body 1a.

Camera 2 is fixed to first body 1a such that the optical axis of camera 2 is inclined with respect to the normal to the display surface of sub-display portion 3b. The optical axis of camera 2 is inclined toward second body 1b or hinge portion 1c with respect to the normal to the display surface of sub-display portion 3b. More specifically, camera 2 is arranged on one (upper side in FIGS. 5A, 5B and 5C) of the vertically opposite sides (upper and lower sides in FIGS. 5A, 5B and 5C) of sub-display portion 3b, and the optical axis of camera 2 is inclined toward the other side.

The optical axis of camera 2 forms angle θ1 from 10 to 30 degrees with respect to the normal to the display surface of sub-display portion 3b. Thus, the optical axis of camera 2 is inclined by angle θ1 from 10 to 30 degrees with respect to the normal to the display surface of sub-display portion 3b toward second body 1b or hinge portion 1c.

Structures other than the above are substantially the same as those of the first embodiment already described. The same components bear the same reference numbers, and description thereof is not repeated.

According to the third embodiment, since camera 2 is fixed to first body 1a to keep fixedly a constant inclination of angle θ1, the operator can take the operator's own picture by camera 2 without keeping the display surface perpendicular to the line of operator's vision. Since it is not necessary to keep the display surface perpendicular to the line of operator's vision when taking the operator's own picture, the operator can incline first body 1a to take an easy position, in which the operator lowers the operator's arm. In this easy position, the operator can take the operator's own picture while checking the operator's own image on sub-display portion 3b.

If angle θ1 is smaller than 10 degrees, it may be difficult to achieve sufficiently the effect intended to be achieved by inclining the optical axis of camera 2 with respect to the normal to the display surface of main display portion 3a. If angle θ1 exceeds 30 degrees, the optical axis of camera 2 intersects the normal to the display surface of sub-display portion 3b at a position closer to camera 2 so that possibly sub-display portion 3b may be unable to display a peripheral portion of the operator's face when the operator takes the operator's own picture while viewing sub-display portion 3b.

Fourth Embodiment

Referring to FIGS. 7A, 7B 7C and 8, a structure of camera-equipped portable device 10 of a fourth embodiment differs from the structure of the second embodiment in that camera 2 is not arranged on the one surface (front surface) of first body 1a, but is arranged on the other surface (rear surface) of first body 1a.

Camera 2 is fixed to first body 1a such that the optical axis of camera 2 is inclined toward center line C-C of camera-equipped portable device 10. More specifically, camera 2 is arranged on one left side in FIG. 7C of the laterally opposite sides (left and right sides in FIG. 7C) of sub-display portion 3b, and the optical axis of camera 2 is inclined toward the other side.

Figure 7:
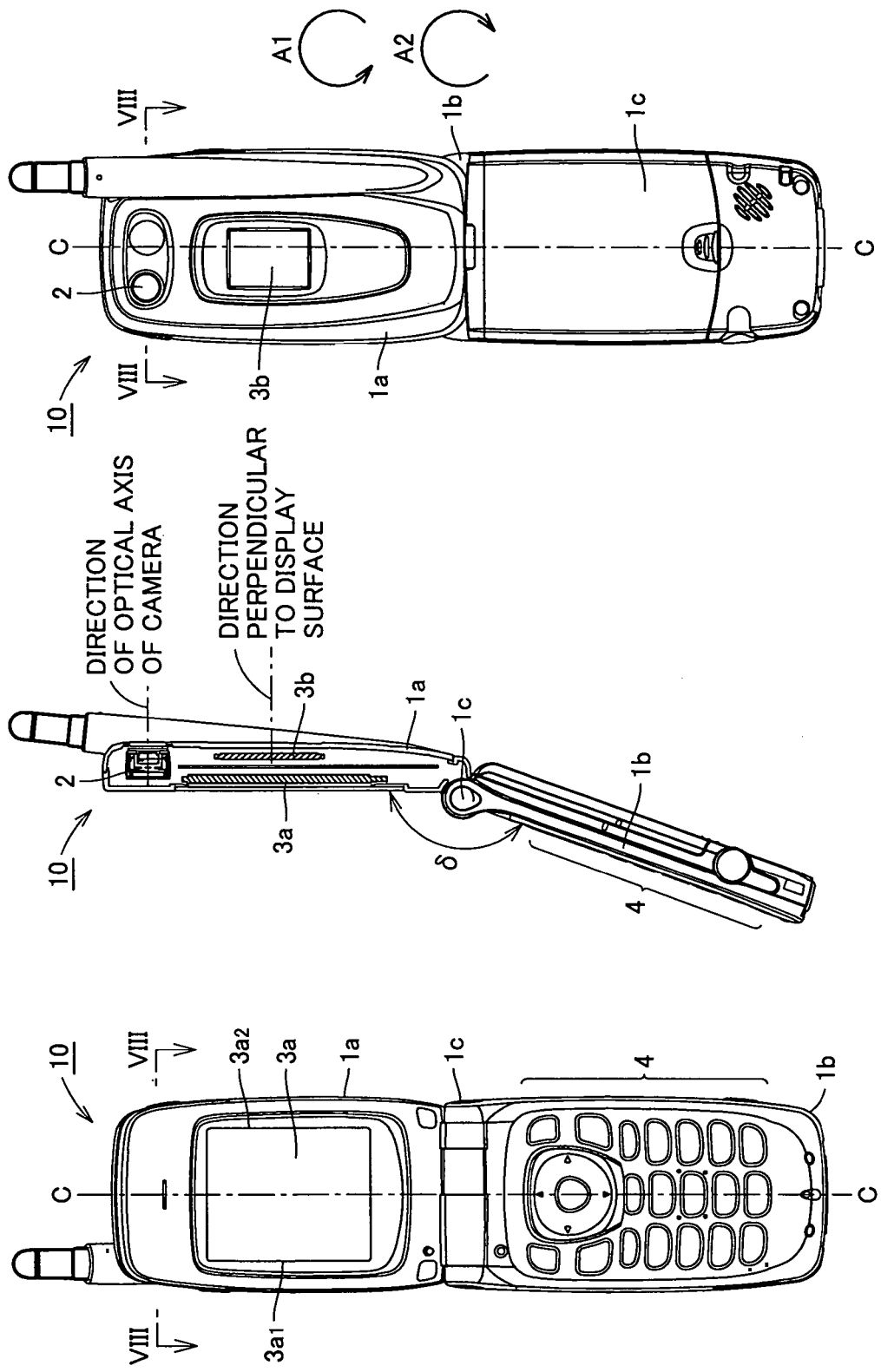
FIGS. 7A, 7B and 7C are a front view, a side view (with only certain parts of a first body cut away) and a rear view schematically showing an image pick-up device of a fourth embodiment of the invention, and particularly showing, by way of example, a structure of a camera-equipped portable device, respectively.
Figure 8:
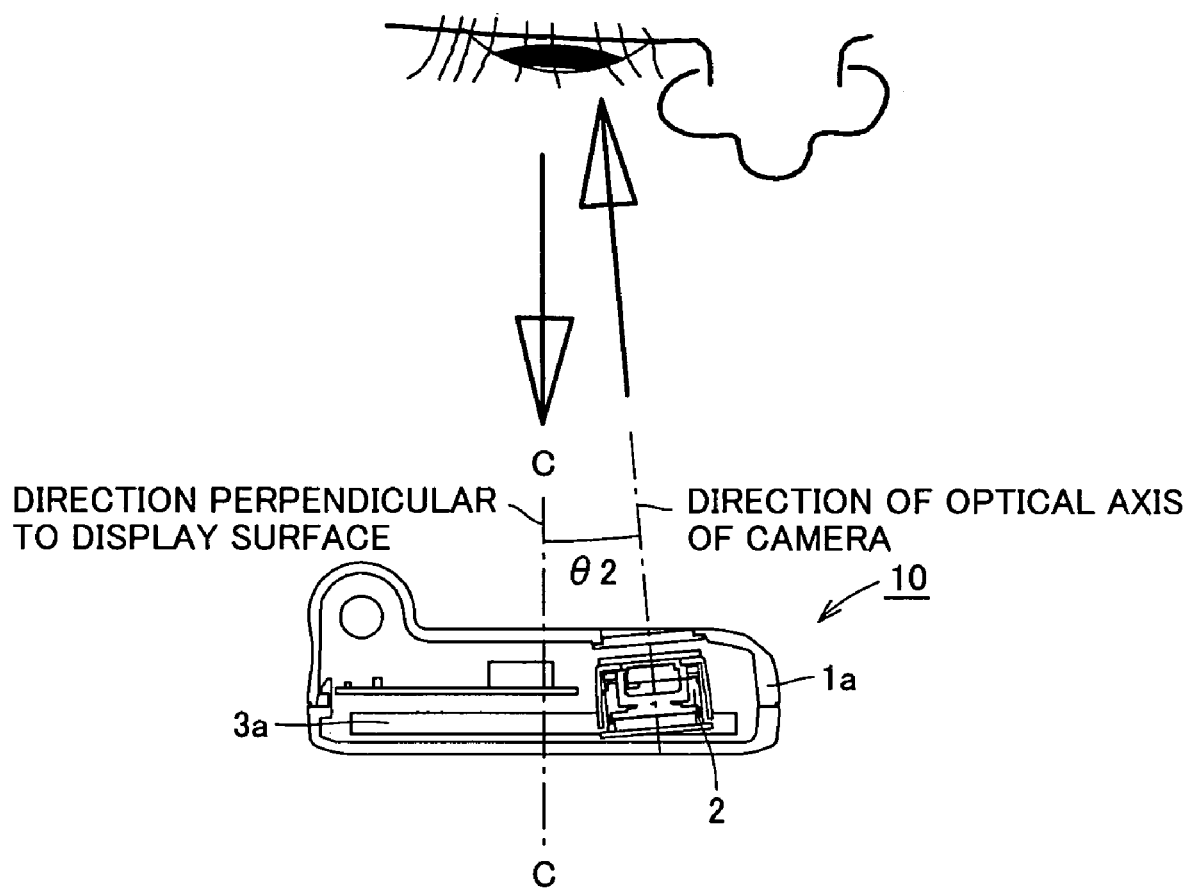
FIG. 8 is a view showing a positional relationship between a display portion of the camera-equipped portable device shown in FIGS. 7A, 7B and 7C and an eye of an operator of the camera, and particularly showing a section taken along line VIII-VIII in FIG. 7A.

More specifically, if camera 2 is located to the left of center line C-C as shown in FIG. 7C, the optical axis of camera 2 is inclined toward the right side (i.e., toward center line C-C) in FIG. 7C. If camera 2 is located to the right of center line C-C in FIG. 7C, the optical axis of camera 2 is inclined toward the left side in FIG. 7C (i.e., toward center line C-C).

The optical axis of camera 2 and the normal to the display surface of sub-display portion 3b form angle θ2 from 10 to 30 degrees. Thus, the optical axis of camera 2 is inclined toward center line C-C at angle θ2 from 10 to 30 degrees with respect to the normal to the display surface of sub-display portion 3b.

Structures other than the above are substantially the same as those of the second embodiment already described. The same components bear the same reference numbers, and description thereof is not repeated.

According to the fourth embodiment, the optical axis of camera 2 is inclined toward center line C-C. Therefore, when the operator keeps the camera-equipped portable device 10 in the horizontal position by rotating it 90 degrees counterclockwise as indicated by arrow A1 from the position shown in FIG. 7C, or by rotating it 90 degrees clockwise as indicated by arrow A2, the operator can take the operator's own picture by camera 2 without keeping the display surface of sub-display portion 3b perpendicular to the line of operator's vision. In particular, even when the operator directs his/her face straightly forward, it is not necessary to keep first body 1a vertical (perpendicular to the ground surface), and the operator can incline first body 1a by shifting the lower portion of sub-display portion 3b toward the operator with respect to the upper portion. This inclined position is easy for the operator because the operator can lower the operator's arm. In this easy position, the operator can take the operator's own picture while checking the operator's own image on sub-display portion 3b.

Fifth Embodiment

Figure 9A:
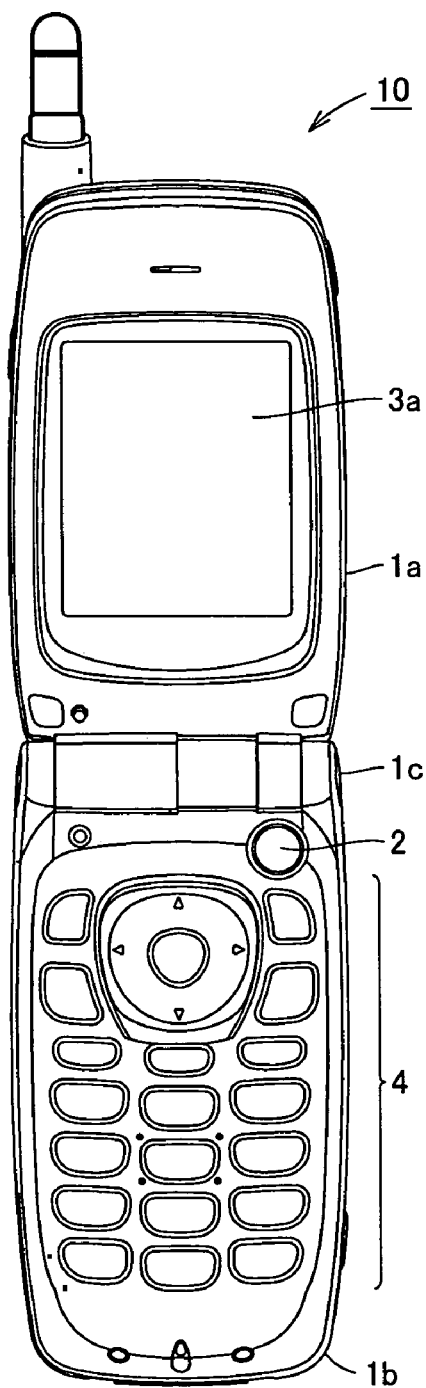
FIGS. 9A and 9B are a front view and a cross section schematically showing an image pick-up device of a fifth embodiment of the invention, and particularly showing, by way of example, a structure of a camera-equipped portable device, respectively.
Figure 9B:
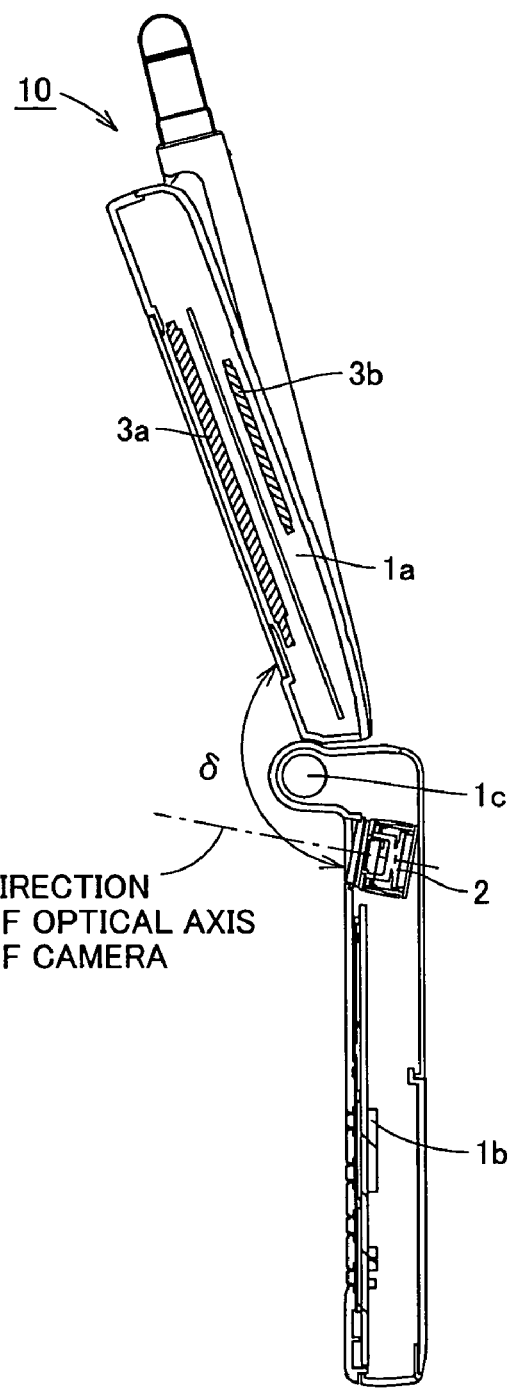
Figure 10:
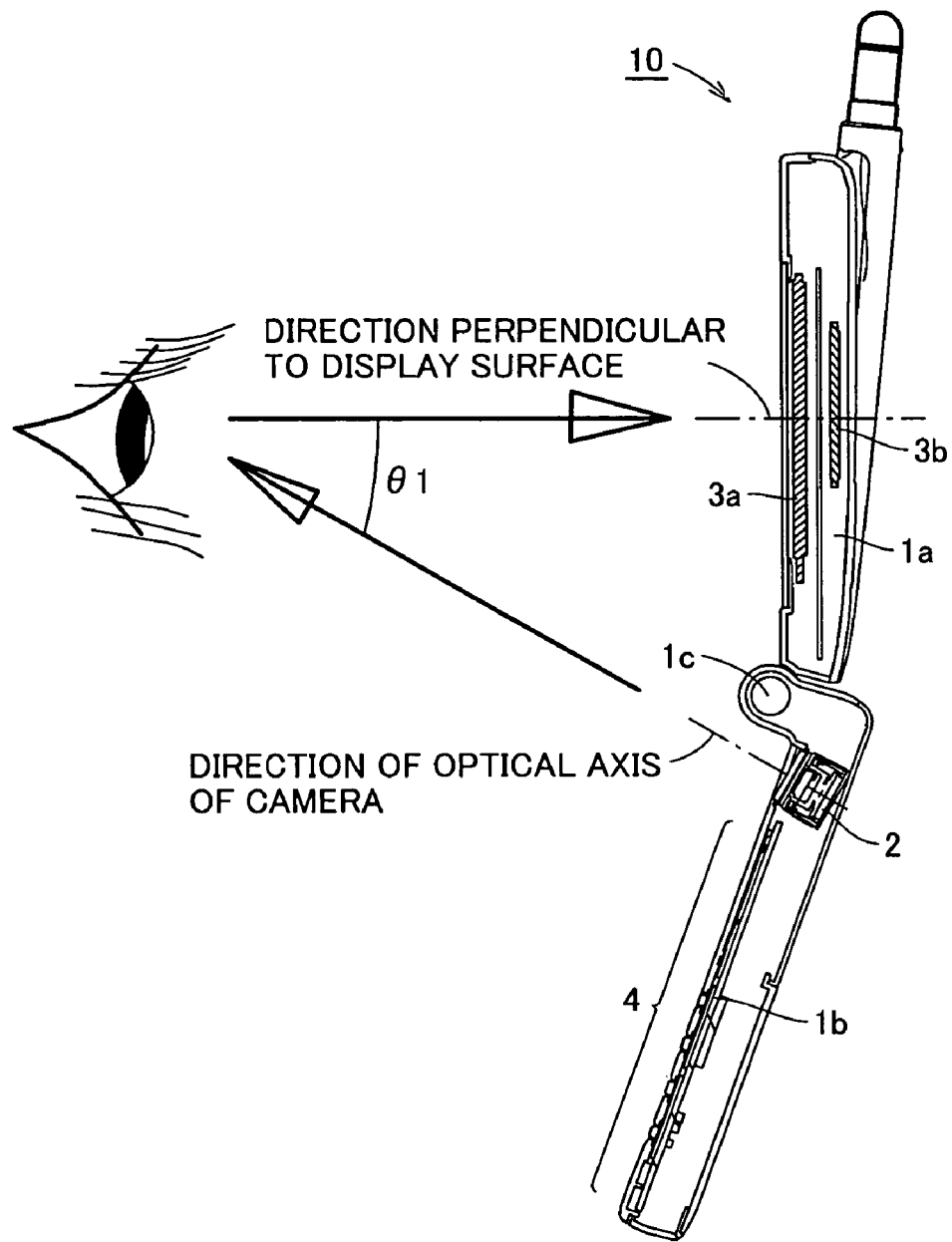
FIG. 10 is a view showing a positional relationship between a display portion of the camera-equipped portable device shown in FIGS. 9A and 9B and an eye of an operator of the camera, and particularly showing a section of the camera-equipped portable device.

Referring to FIGS. 9A, 9B and 10, a structure of camera-equipped portable device 10 of a fifth embodiment differs from the structure of the first embodiment in that camera 2 is fixed to second body 1b.

Camera 2 is fixed to second body 1b such that the optical axis of camera 2 extends in a direction different from the direction perpendicular to the display surface of main display portion 3a. The optical axis of camera 2 is inclined toward first body 1a or hinge portion 1c with respect to the normal to the display surface of main display portion 3a. More specifically, camera 2 is arranged on one (lower side in FIGS. 9A and 9B) of the vertically opposite sides of main display portion 3a, and the optical axis of camera 2 is inclined toward the other side (upper side in FIGS. 9A and 9B). Further, the optical axis of camera 2 is inclined toward main display portion 3a with respect to the normal to the surface of second body 1b.

The optical axis of camera 2 and the normal to the display surface of main display portion 3a form angle θ1 from 5 to 10 degrees. Thus, the optical axis of camera 2 is inclined toward first body 1a or hinge portion 1c with respect to the normal to the display surface of main display portion 3a at angle θ1 from 5 to 10 degrees.

Structures other than the above are substantially the same as those of the first embodiment already described. The same components bear the same reference numbers, and description thereof is not repeated.

This embodiment can achieve substantially the same effect as the first embodiment.

Sixth Embodiment

Figure 12:
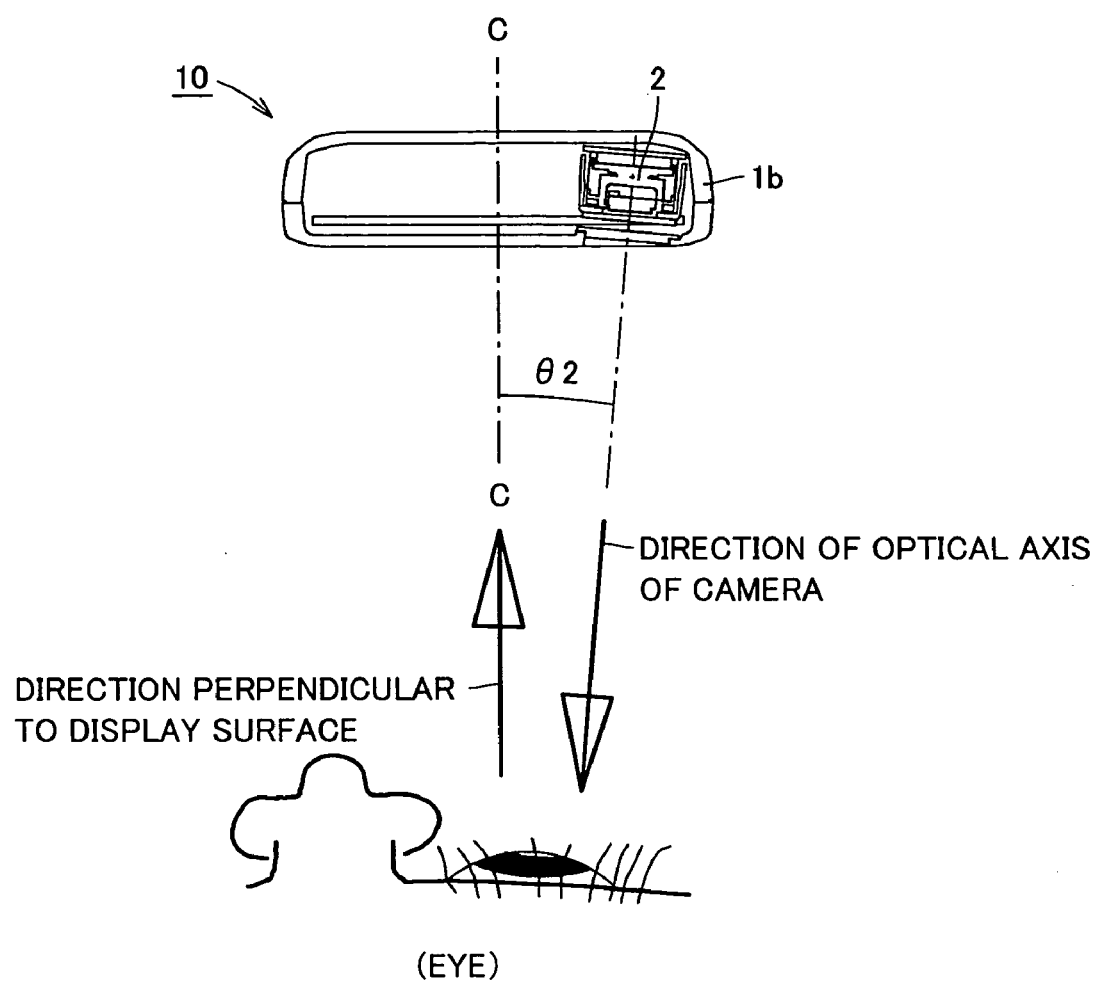
FIG. 12 is a view showing a positional relationship between a display portion of the camera-equipped portable device shown in FIGS. 11A and 11B and an eye of an operator of the camera, and particularly showing a section taken along line XII-XII in FIG. 11A.
Figure 13C:
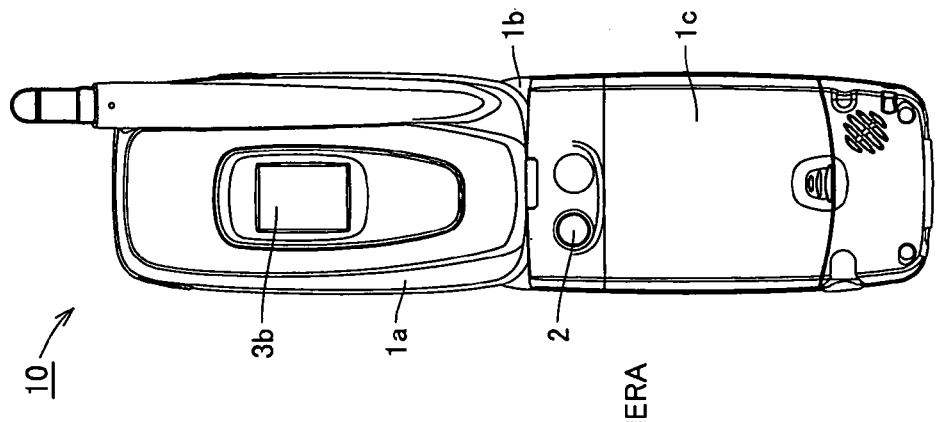
FIGS. 13A, 13B and 13C are a front view, a cross section and a rear view schematically showing an image pick-up device of a seventh embodiment of the invention, and particularly showing, by way of example, a structure of a camera-equipped portable device, respectively.
Figure 13B:
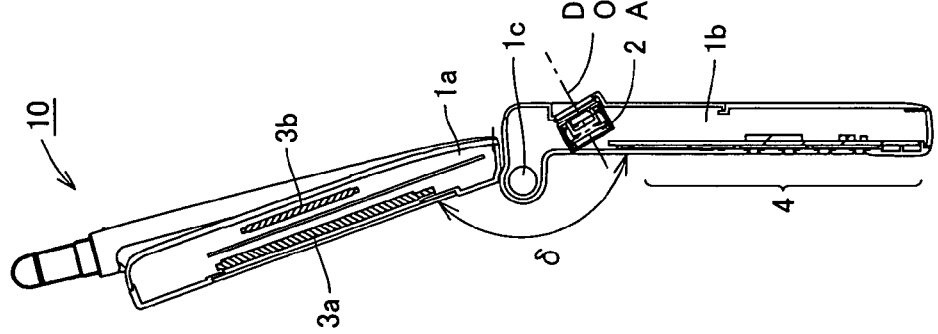
Figure 13A:
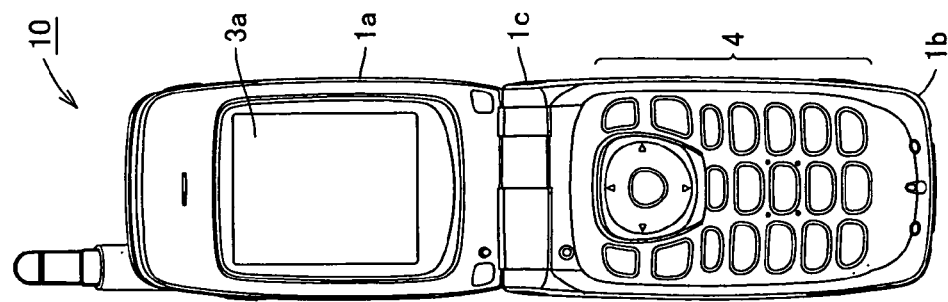
Figure 14:
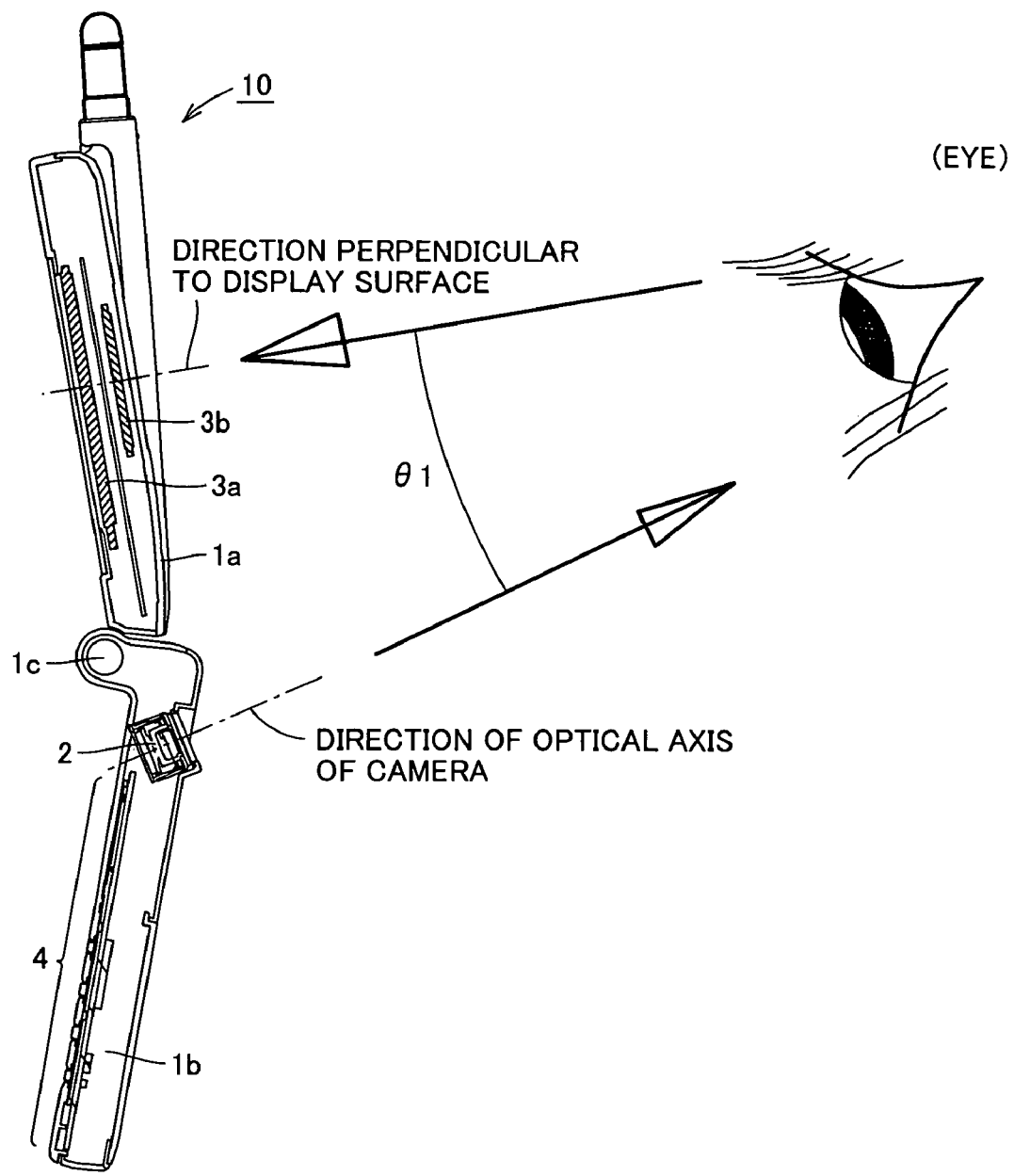
FIG. 14 is a view showing a positional relationship between a display portion of the camera-equipped portable device shown in FIGS. 13A, 13B and 13C and an eye of an operator of the camera, and particularly showing a section of the camera-equipped portable device.
Figure 16:
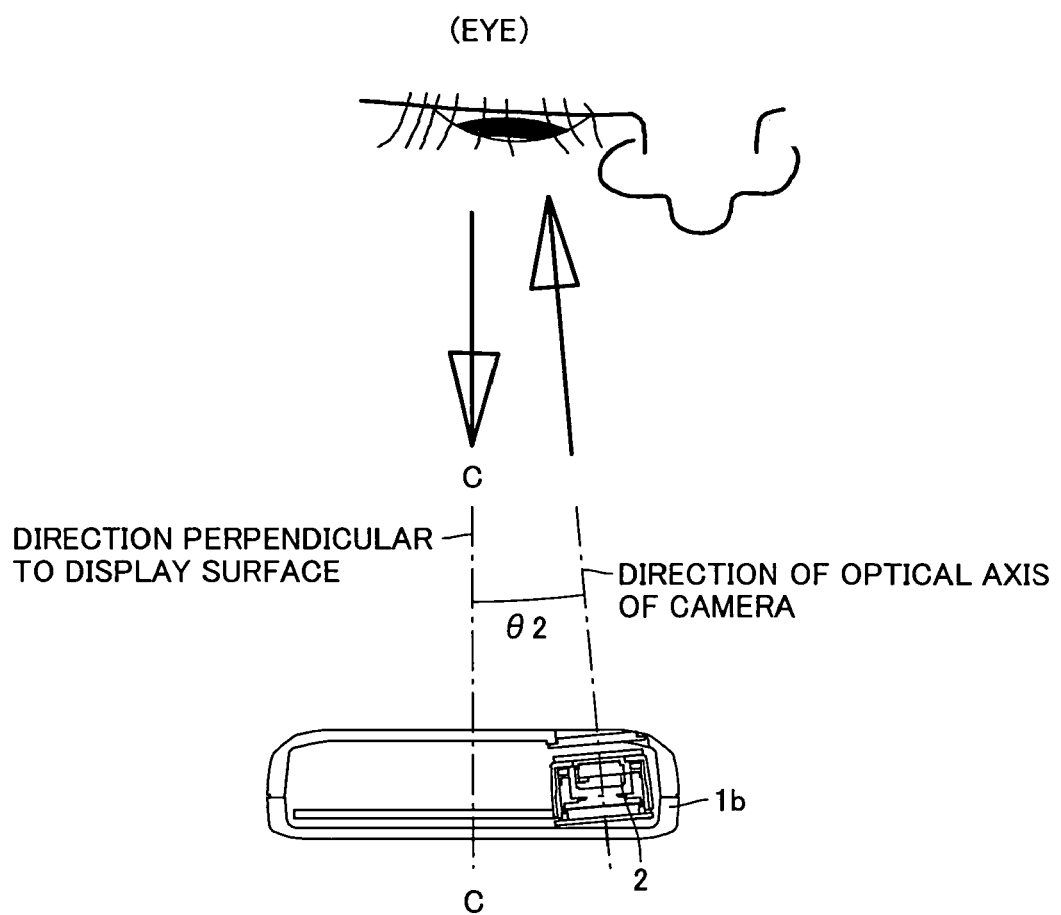
FIG. 16 is a view showing a positional relationship between a display portion of the camera-equipped portable device shown in FIGS. 15A, 15B and 15C and an eye of an operator of the camera, and particularly showing a section taken along line XVI-XVI in FIG. 15C.

Referring to FIGS. 11A, 11B and 12, a structure of camera-equipped portable device 10 of a sixth embodiment differs from the structure of the fifth embodiment in the inclination direction of the optical axis of camera 2.

Camera 2 is fixed to second body 1b such that the optical axis of camera 2 is inclined toward center line C-C of camera-equipped portable device 10. More specifically, camera 2 is arranged on one (right side in FIG. 11A) of the laterally opposite sides (left and right sides in FIG. 11A) of main display portion 3a, and the optical axis of camera 2 is inclined toward the other side.

More specifically, if camera 2 is located to the right of center line C-C as shown in FIG. 11A, the optical axis of camera 2 is inclined toward the left side as shown in FIG. 12 (i.e., toward center line C-C). If camera 2 is located to the left of center line C-C in FIG. 11A, the optical axis of camera 2 is inclined toward the right side in FIG. 12 (i.e., toward center line C-C).

The optical axis of camera 2 and the normal to the display surface of main display portion 3a form angle θ2 from 5 to 10 degrees. Thus, the optical axis of camera 2 is inclined toward center line C-C with respect to the normal to the display surface of main display portion 3a at angle θ2 from 5 to 10 degrees.

Structures other than the above are substantially the same as those of the first embodiment already described. The same components bear the same reference numbers, and description thereof is not repeated.

This embodiment can achieve substantially the same effect as the second embodiment.

Seventh Embodiment

Referring to FIGS. 13A, 13B, 13C and 14, a structure of camera-equipped portable device 10 of a seventh embodiment differs from the structure of the fifth embodiment in that camera 2 is not arranged on the one surface (front surface) of second body 1b, but is arranged on the other surface (rear surface) of second body 1b.

Camera 2 is fixed to second body 1b such that the optical axis of camera 2 extends in a direction different from the direction perpendicular to the display surface of sub-display portion 3b. The optical axis of camera 2 is inclined toward first body 1a or hinge portion 1c with respect to the normal to the display surface of sub-display portion 3b. More specifically, camera 2 is arranged on one (lower side in FIGS. 13A, 13B and 13C) of the vertically opposite sides of sub-display portion 3b, and the optical axis of camera 2 is inclined toward the other side (upper side in FIGS. 13A, 13B and 13C).

The optical axis of camera 2 and the normal to the display surface of sub-display portion 3b form angle θ1 from 10 to 30 degrees. Thus, the optical axis of camera 2 is inclined toward first body 1a or hinge portion 1c with respect to the normal to the display surface of sub-display portion 3b at angle θ1 from 10 to 30 degrees.

Structures other than the above are substantially the same as those of the fifth embodiment already described. The same components bear the same reference numbers, and description thereof is not repeated.

This embodiment can achieve substantially the same effect as the third embodiment.

Eighth Embodiment

Referring to FIGS. 15A, 15B, 15C and 16, a structure of camera-equipped portable device 10 of an eighth embodiment differs from the structure of the sixth embodiment in that camera 2 is not arranged on the one surface (front surface) of second body 1b, but is arranged on the other surface (rear surface) of second body 1b.

Camera 2 is fixed to first body 1a such that the optical axis of camera 2 is inclined toward center line C-C of camera-equipped portable device 10. More specifically, camera 2 is arranged on one (left side in FIG. 15C) of the laterally opposite sides of sub-display portion 3b, and the optical axis of camera 2 is inclined toward the other side.

More specifically, if camera 2 is located to the left of center line C-C as shown in FIG. 15C, the optical axis of camera 2 is inclined toward the right side (i.e., toward center line C-C) as shown in FIG. 15C. If camera 2 is located to the right of center line C-C in FIG. 15C, the optical axis of camera 2 is inclined toward the left side in FIG. 15C (i.e., toward center line C-C).

The optical axis of camera 2 and the normal to the display surface of sub-display portion 3b form angle θ2 from 10 to 30 degrees. Thus, the optical axis of camera 2 is inclined toward center line C-C at angle θ2 from 10 to 30 degrees with respect to the normal to the display surface of sub-display portion 3b.

Structures other than the above are substantially the same as those of the sixth embodiment already described. The same components bear the same reference numbers, and description thereof is not repeated.

This embodiment can achieve substantially the same effect as the fourth embodiment.

Ninth Embodiment

Figure 17A:
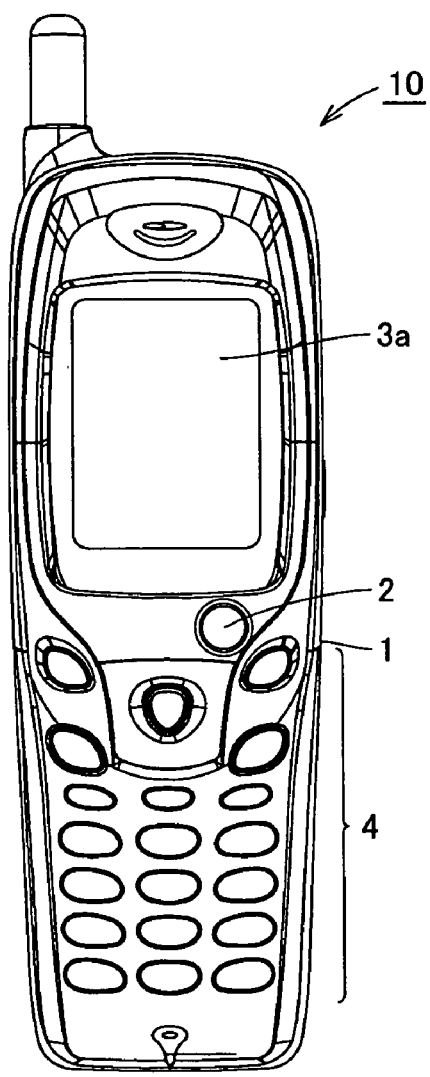
FIGS. 17A and 17B are a front view and a cross section schematically showing an image pick-up device of a ninth embodiment of the invention, and particularly showing, by way of example, a structure of a camera-equipped portable device, respectively.
Figure 17B:
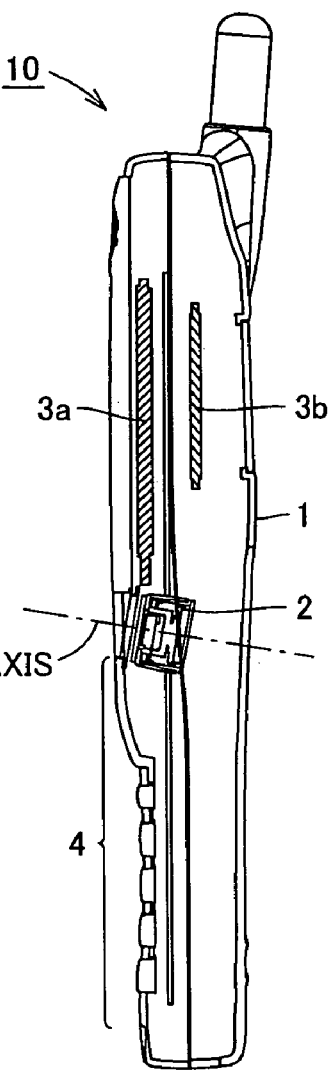
Figure 18:
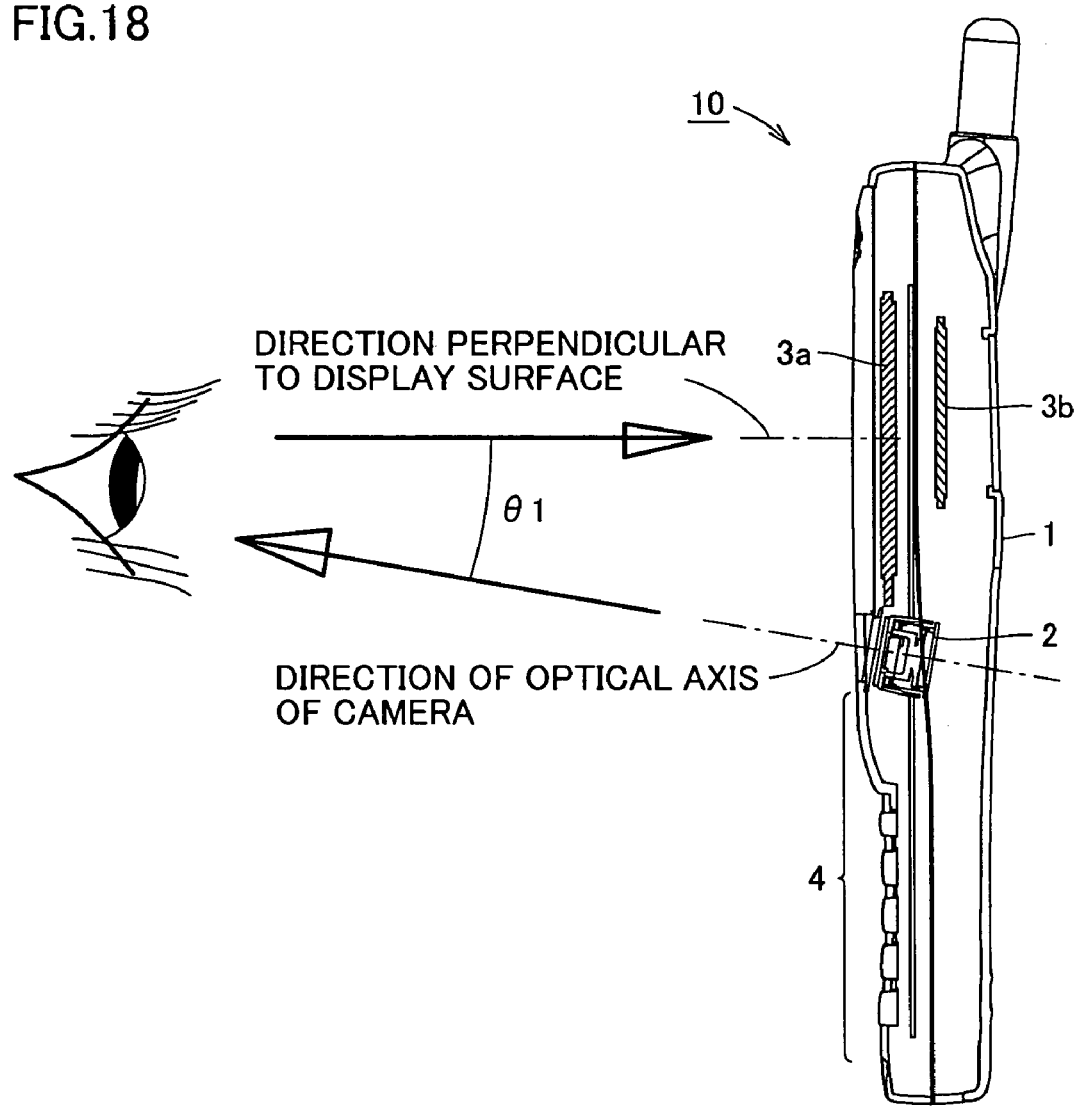
FIG. 18 is a view showing a positional relationship between a display portion of the camera-equipped portable device shown in FIGS. 17A and 17B and an eye of an operator of the camera.

Referring to FIGS. 17A, 17B and 18, camera-equipped portable device 10 of a ninth embodiment is not of a foldable type, but is of a straight type, in which a main body is not divided, and is formed of a single body. Camera-equipped portable device 10 primarily includes main body 1, camera 2, main display portion 3a, sub-display portion 3b and a plurality of input buttons 4.

Main body 1 is provided on one (i.e., a front surface) of its opposite surfaces with camera 2, main display portion 3a and the plurality of input buttons 4, and is provided on the other side (i.e., rear surface) with sub-display portion 3b.

Camera 2 is fixed to main body 1 such that the optical axis of camera 2 extends in a direction different from the direction perpendicular to the display surface of main display portion 3a. The optical axis of camera 2 is inclined toward main display portion 3a or the plurality of input buttons 4 with respect to the direction perpendicular to the display surface (i.e., with respect to the normal to the display surface) of main display portion 3a. More specifically, camera 2 is arranged on one (lower side in FIGS. 17A and 17B) of the vertically opposite sides (upper and lower sides in FIGS. 17A and 17B) of main display portion 3a, and the optical axis of camera 2 is inclined toward the other side.

The optical axis of camera 2 forms angle θ1 from 5 to 10 degrees with respect to the normal to the display surface of main display portion 3a. Thus, the optical axis of camera 2 is inclined by angle θ1 from 5 to 10 degrees with respect to the normal to the display surface of main display portion 3a toward main display portion 3a or the plurality of input buttons 4.

According to this embodiment, since camera 2 is fixed to main body 1 to keep the fixed inclination of angle θ1 with respect to main body 1, it is not necessary to keep the display surface perpendicular to the line of operator's vision when the operator takes the operator's own picture. Thus, it is not necessary to keep main body 1 vertical, and the operator can take the easy inclined position with the operator's arm lowered. In this easy position, the operator can take the operator's own picture while checking the operator's own image on main display portion 3a.

Tenth Embodiment

Figure 20:
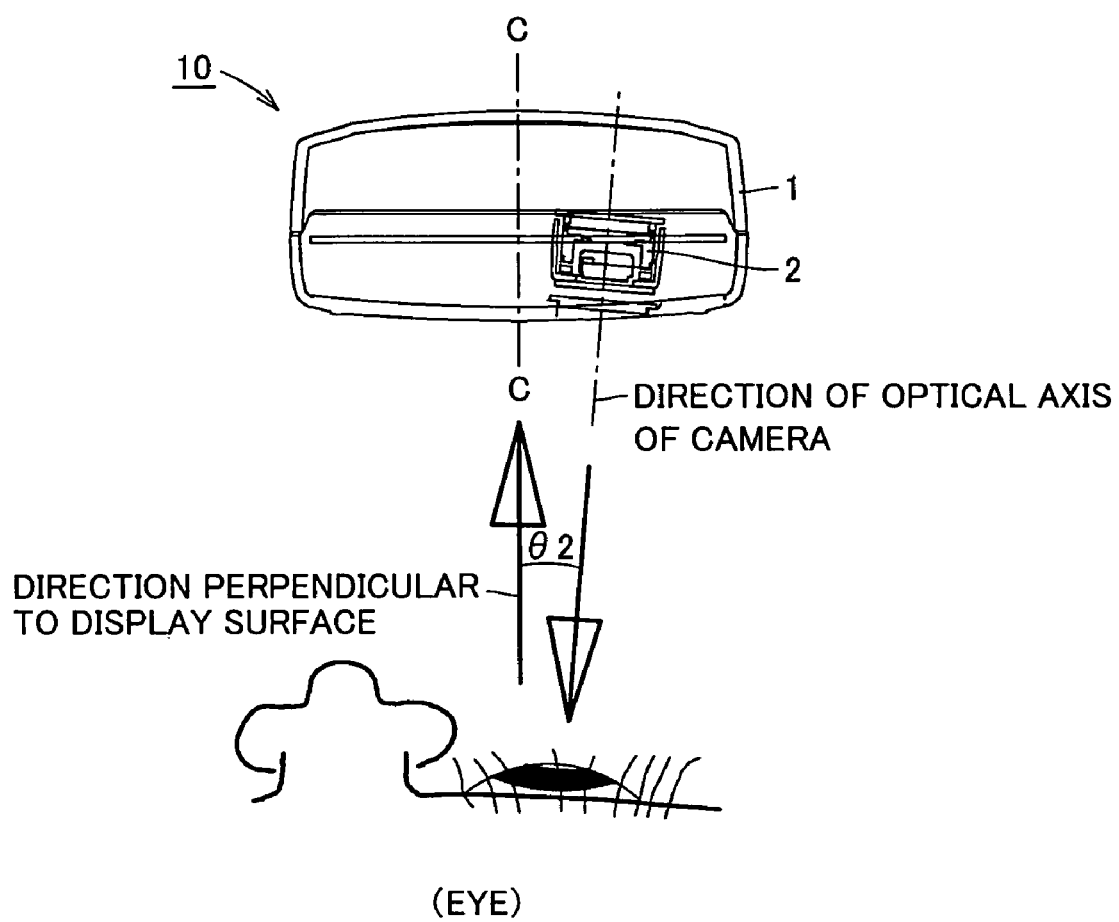
FIG. 20 is a view showing a positional relationship between a display portion of the camera-equipped portable device shown in FIGS. 19A and 19B and an eye of an operator of the camera, and particularly showing a section taken along line XX-XX in FIG. 19A.
Figure 21C:
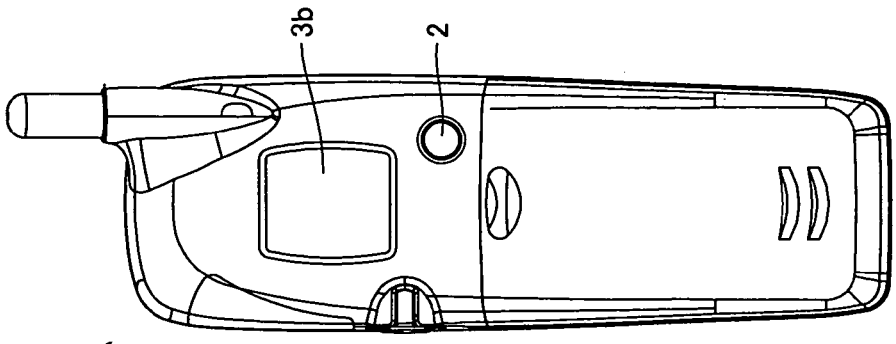
FIGS. 21A, 21B and 21C are a front view, a cross section and a rear view schematically showing an image pick-up device of an eleventh embodiment of the invention, and particularly showing, by way of example, a structure of a camera-equipped portable device, respectively.
Figure 21B:
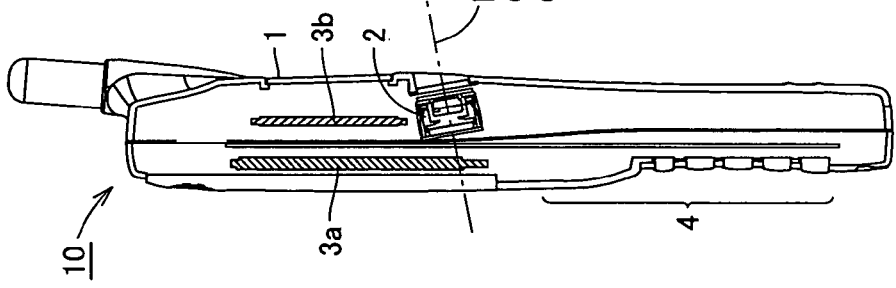
Figure 21A:
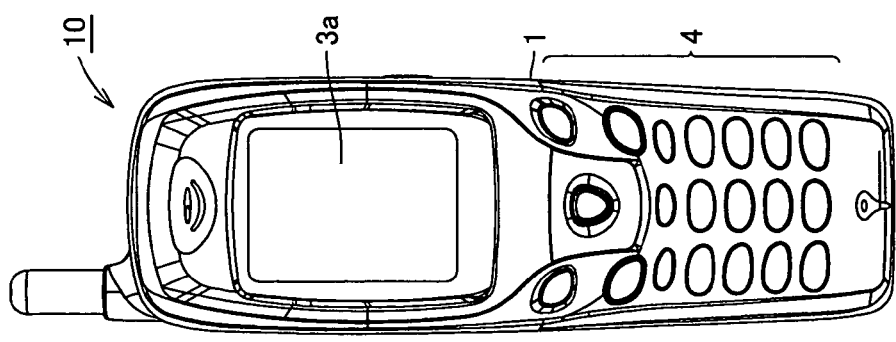
Figure 22:
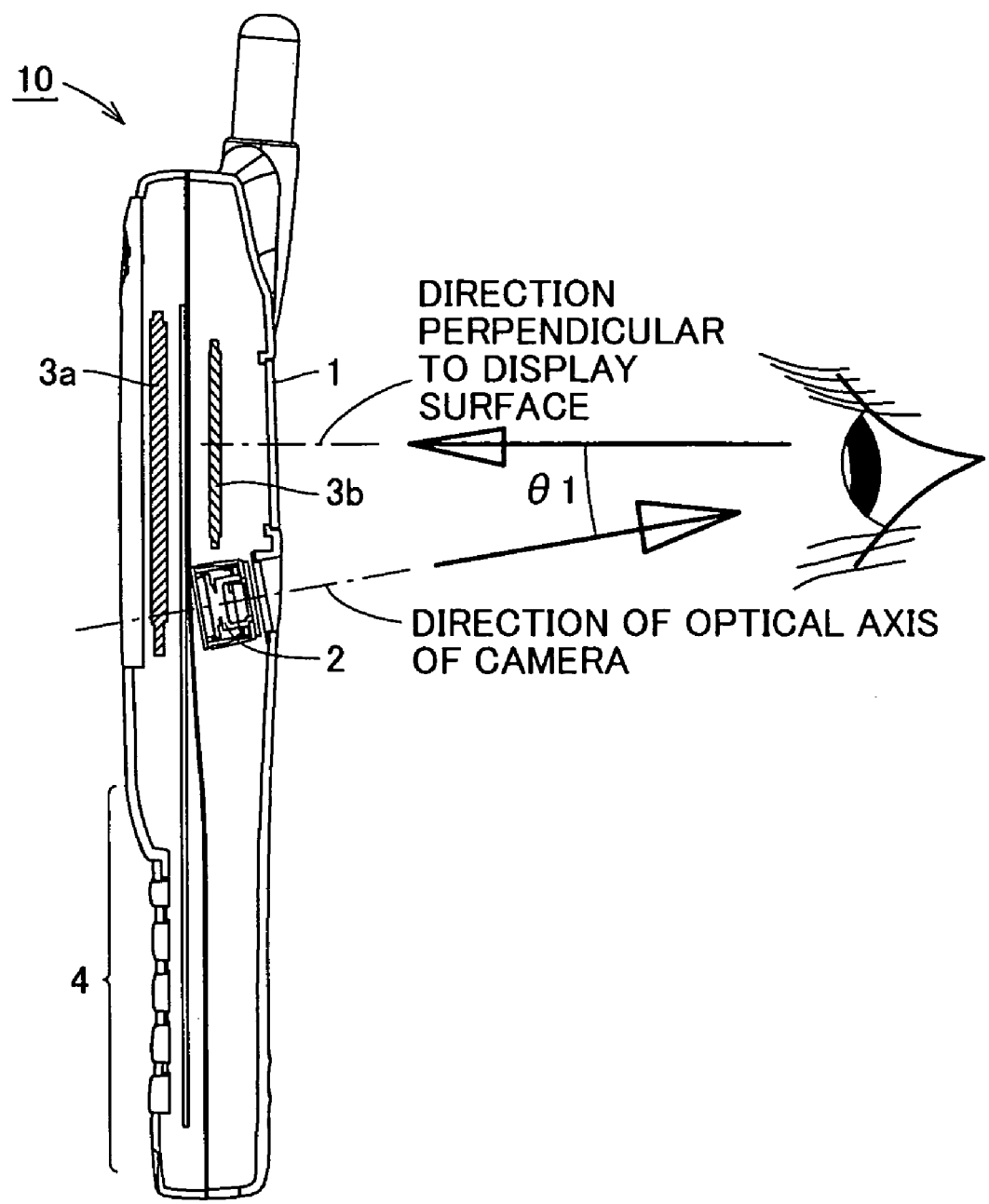
FIG. 22 is a view showing a positional relationship between a display portion of the camera-equipped portable device shown in FIGS. 21A, 21B and 21C and an eye of an operator of the camera.
Figure 24:
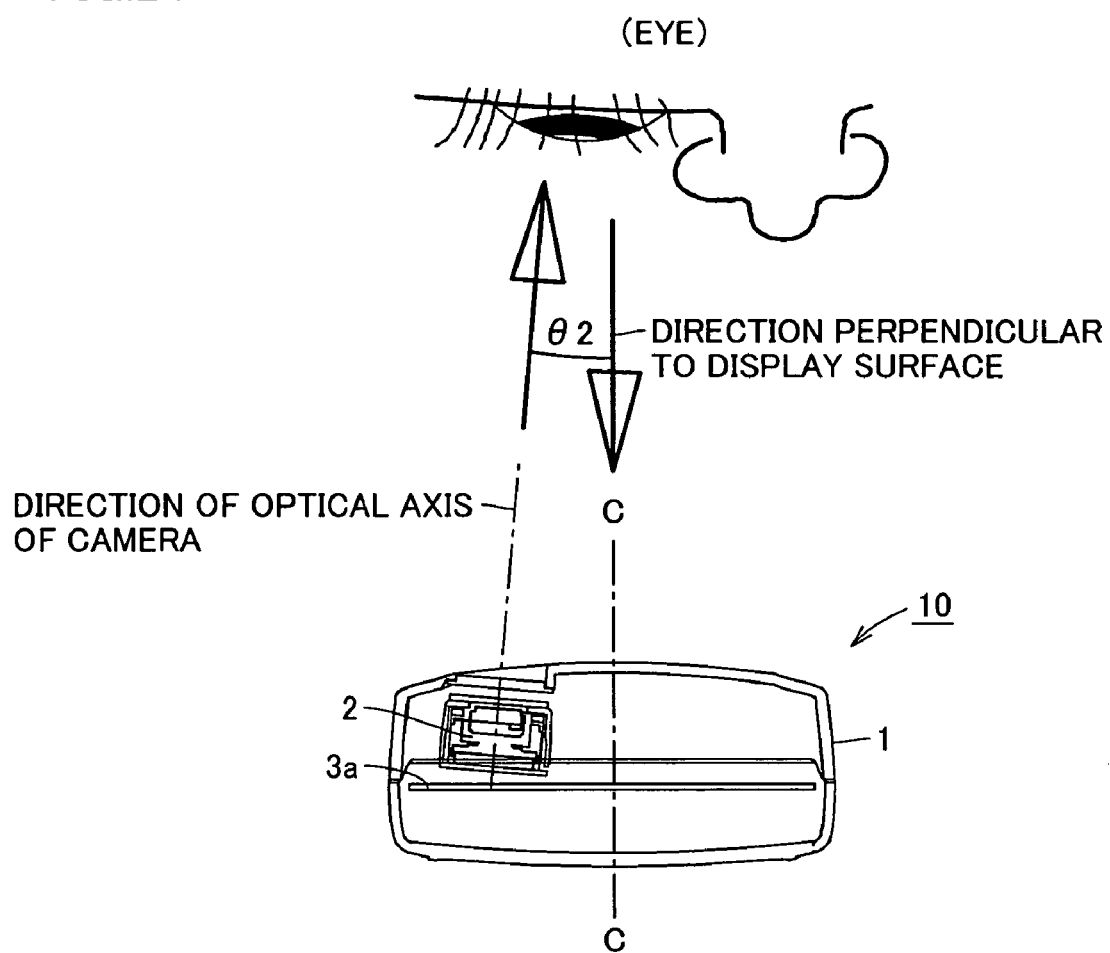
FIG. 24 is a view showing a positional relationship between a display portion of the camera-equipped portable device shown in FIGS. 23A, 23B and 23C and an eye of an operator of the camera, and particularly showing a section taken along line XXIV-XXIV in FIG. 23C.

Referring to FIGS. 19A, 19B and 20, a structure of camera-equipped portable device 10 of a tenth embodiment differs from the structure of the ninth embodiment in the inclination direction of the optical axis of camera 2.

Camera 2 is fixed to main body 1 such that the optical axis of camera 2 is inclined toward center line C-C of camera-equipped portable device 10. More specifically, camera 2 is arranged on one (right side in FIG. 19A) of the laterally opposite sides (left and right sides in FIG. 19A) of main display portion 3a, and the optical axis of camera 2 is inclined toward the other side.

More specifically, if camera 2 is located to the right of center line C-C as shown in FIG. 19A, the optical axis of camera 2 is inclined toward the left side (i.e., toward center line C-C) as shown in FIG. 20. If camera 2 is located to the left of center line C-C in FIG. 19A, the optical axis of camera 2 is inclined toward the right side in FIG. 20 (i.e., toward center line C-C).

The optical axis of camera 2 and the normal to the display surface of main display portion 3a form angle θ2 from 5 to 10 degrees. Thus, the optical axis of camera 2 is inclined toward center line C-C with respect to the normal to the display surface of main display portion 3a at angle θ2 from 5 to 10 degrees.

Structures other than the above are substantially the same as those of the first embodiment already described. The same components bear the same reference numbers, and description thereof is not repeated.

This embodiment can achieve substantially the same effect as the second embodiment.

Eleventh Embodiment

Referring to FIGS. 21A, 21B, 21C and 22, a structure of camera-equipped portable device 10 according to an eleventh embodiment differs from the structure of the ninth embodiment in that camera 2 is not arranged on the one surface (front surface) of main body 1, but is arranged on the other surface (rear surface) of main body 1.

Camera 2 is fixed to main body 1 such that the optical axis of camera 2 is inclined with respect to the normal to the display surface of sub-display portion 3b. The optical axis of camera 2 is inclined toward sub-display portion 3b with respect to the normal to the display surface of sub-display portion 3b. More specifically, camera 2 is arranged on one (lower side in FIGS. 21A, 21B and 21C) of the vertically opposite sides (upper and lower sides in FIGS. 21A, 21B and 21C) of sub-display portion 3b, and the optical axis of camera 2 is inclined toward the other side.

The optical axis of camera 2 forms angle θ1 from 10 to 30 degrees with respect to the normal to the display surface of sub-display portion 3b. Thus, the optical axis of camera 2 is inclined by angle θ1 from 10 to 30 degrees with respect to the normal to the display surface of sub-display portion 3b toward sub-display portion 3b.

Structures other than the above are substantially the same as those of the first embodiment already described. The same components bear the same reference numbers, and description thereof is not repeated.

This embodiment can achieve substantially the same effect as the third embodiment.

Twelfth Embodiment

Referring to FIGS. 23A, 23B, 23C and 24, a structure of camera-equipped portable device 10 of a twelfth embodiment differs from the structure of the tenth embodiment in that camera 2 is not arranged on the one surface (front surface) of main body 1, but is arranged on the other surface (rear surface) of main body 1.

Camera 2 is fixed to main body 1 such that the optical axis of camera 2 is inclined toward center line C-C of camera-equipped portable device 10. More specifically, camera 2 is arranged on one (right side in FIG. 23C) of the laterally opposite sides (left and right sides in FIG. 23C) of sub-display portion 3b, and the optical axis of camera 2 is inclined toward the other side.

More specifically, if camera 2 is located to the right of center line C-C as shown in FIG. 23C, the optical axis of camera 2 is inclined toward the left side (i.e., toward center line C-C) in FIG. 23C. If camera 2 is located to the left of center line C-C in FIG. 23C, the optical axis of camera 2 is inclined toward the right side in FIG. 23C (i.e., toward center line C-C).

The optical axis of camera 2 and the normal to the display surface of sub-display portion 3b form angle θ2 from 10 to 30 degrees. Thus, the optical axis of camera 2 is inclined toward center line C-C at angle θ2 from 10 to 30 degrees with respect to the normal to the display surface of sub-display portion 3b.

Structures other than the above are substantially the same as those of the tenth embodiment already described. The same components bear the same reference numbers, and description thereof is not repeated.

This embodiment can achieve substantially the same effect as the fourth embodiment.

Thirteenth Embodiment

Figure 26:
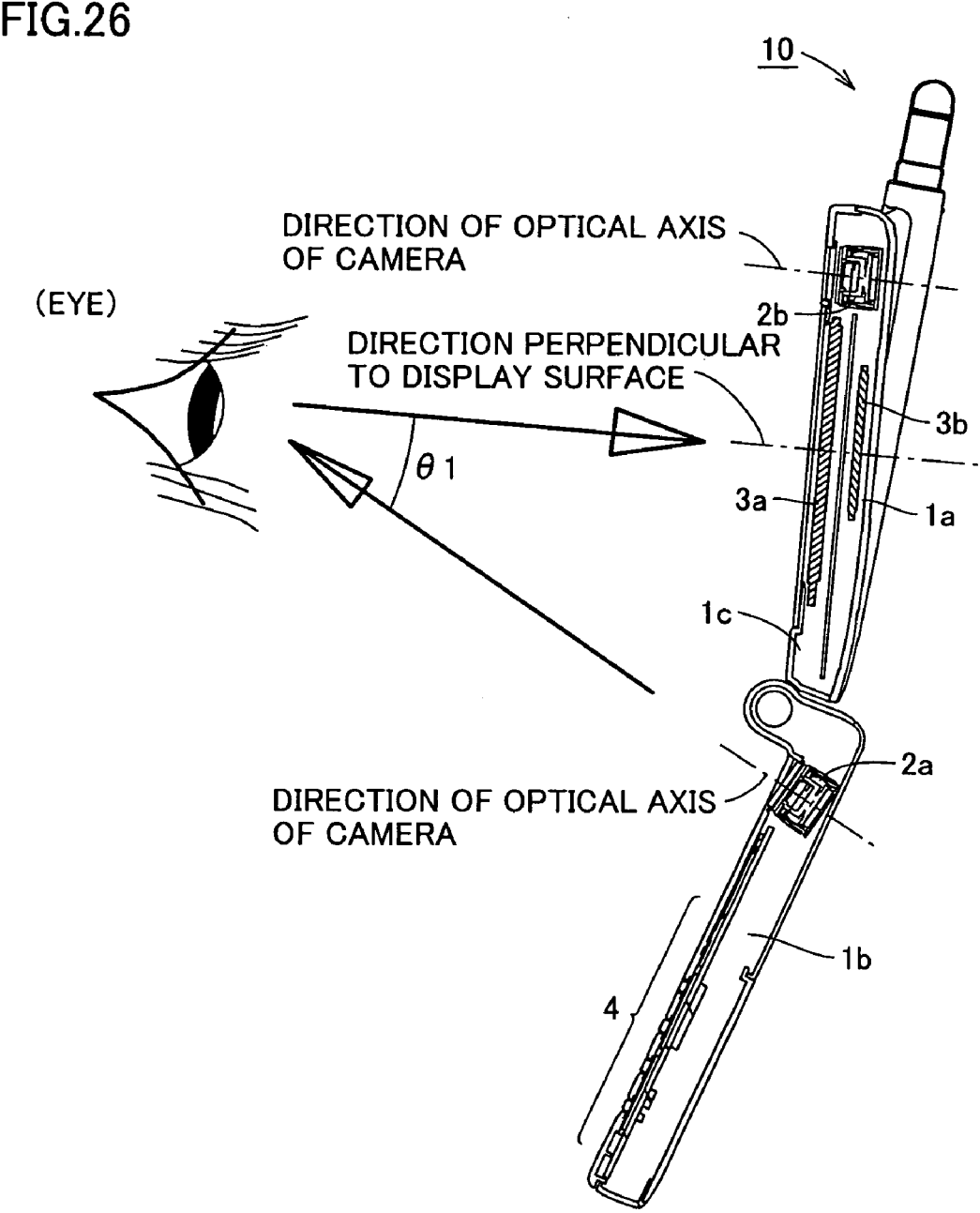
FIG. 26 is a view showing a positional relationship between a display portion of the camera-equipped portable device shown in FIGS. 25A and 25B and an eye of an operator of the camera.

Referring to FIGS. 25A, 25B and 26, a structure of camera-equipped portable device 10 of a thirteenth embodiment differs from a structure of a first embodiment in that two cameras 2a and 2b are arranged, and each of cameras 2a and 2b has an optical axis extending in an intended inclination direction.

Camera 2b is arranged on first body 1a, and camera 2a is arranged on second body 1b. For example, the optical axis of camera 2b is directed perpendicular to the display surface of main display portion 3a, and the optical axis of camera 2a is inclined toward the upper side in FIG. 25A, similarly to the fifth embodiment. In this structure, the operator can take an easy position by selecting one of cameras 2a and 2b when the operator takes the operator's own picture while viewing main display portion 3a.

Although not shown, the optical axis of camera 2b may be perpendicular to the display surface of main display portion 3a, and the optical axis of camera 2a may be laterally inclined in FIG. 25A, as is done, e.g., in the sixth embodiment. In this case, the operator can take pictures in an easy position by selecting the two cameras depending on the positions (i.e., the vertical and horizontal positions) of camera-equipped portable device 10.

Although not shown, such a structure may be employed that both the two cameras are arranged on one (i.e., the front surface) of the opposite surfaces of first body 1a, the optical axis of one of the cameras is inclined vertically in FIG. 25A, as is done in the first embodiment, and the optical axis of the other camera is inclined laterally in FIG. 25A, as is done in the second embodiment. In this structure, the two cameras can be selected depending on the positions (i.e., the vertical and horizontal positions) of camera-equipped portable device 10 selected for the picture taking.

Although not shown, both the cameras may be arranged on the other surface (rear surface) of first body 1a. Also, both the cameras may be arranged on the one surface (front surface) of second body 1b, or on the other surface (rear surface) of second body 1b. In these cases, the two cameras can be selectively used depending on the selected positions (i.e., vertical and horizontal positions) of camera-equipped portable device 10.

Although not shown, such a structure may also be employed that one of the two cameras may be arranged on the one surface (front surface) of one of the first and second bodies 1a and 1b, and the other of the two cameras may be arranged on the other surface (rear surface) of the same body (i.e., the above one of the first and second bodies 1a and 1b). In this structure, one of the cameras on the front and rear surfaces may have the optical axis perpendicular to the display surface, and the other of the cameras may have the optical axis inclined with respect to the normal to the display surface.

Although description has been given on the case where the device includes the two cameras, it may employ three or more cameras. The plurality of cameras described above are employed in the device of the foldable type, a plurality of cameras may be employed in the main body of the straight type.

Although the embodiments have been described in connection with the cellular phones of the foldable type and the straight type, the invention is not restricted to this, and may be applied to cellular phones of a flip type. Further, the embodiments have been described in connection with the camera-equipped cellular phone. However, the invention is not restricted to the cellular phones, and may be widely applied to camera-equipped portable devices such as a PDS (Personal Digital Assistant) or a notebook personal computer. Although the embodiments have been described in connection with the camera-equipped portable devices, the invention can be widely applied to image pick-up devices, in which a camera and a display device are arranged on the same surface or side.

According to the image pick-up device of the invention, as described above, the direction of the optical axis of the camera is different from the direction perpendicular to the display surface of the display device. Therefore, the operator is not required to keep the display surface perpendicular to the line of operator's vision when taking the operator's own picture. In particular, even when the operator directs his/her face straightly forward, it is not necessary to keep the body vertical (i.e., perpendicular to the ground surface), and can keep the body in the inclined easy position, in which the lower portion of the display surface is shifted toward the operator with respect to its upper portion, when the operator takes the operator's own picture while checking the operator's own image on the display surface.

Since the camera is fixed to the body in such a position that the direction of the optical axis of the camera is different from the direction perpendicular to the display surface, it is not necessary to employ a rotary mechanism for allowing rotation of the camera so that the optical axis of the camera can be inclined with respect to the normal to the display surface. Therefore, it is possible to prevent increase in numbers of parts and assembly steps due to such a rotary mechanism, and thus to prevent increase in product cost.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image pick-up device comprising:
   a main body including a first body having a first surface and a second body having a second surface;
   a camera located on the second surface for taking a picture; and
   a display device displaying a picture taken from the perspective of the camera and arranged at the first surface of said first body on the same side as said camera, wherein
   said camera is rigidly fixed to said main body such that an optical axis of said camera extends in a direction different from a direction perpendicular to a display surface of said display device and the optical axis of the camera extends in a direction different from a direction perpendicular to the second surface, wherein an inclination angle of the optical axis with respect to the second surface does not change.

2. The image pick-up device according to claim 1, wherein said camera is arranged on one side of the vertically opposite sides of said display device, and the optical axis of said camera is inclined toward the other side.

3. The image pick-up device according to claim 1, wherein said camera is arranged on one side of the laterally opposite sides of said display device, and the optical axis of said camera is inclined toward the other side.

4. The image pick-up device according to claim 1, wherein said display device is a main display portion arranged on one of opposite surfaces of said main body,
   said image pick-up device further comprises a sub-display portion arranged on the other surface of said main body, and
   said camera and said main display portion are arranged on said one of the opposite surfaces of said main body.

5. The image pick-up device according to claim 1, further comprising:
   a main display portion arranged on one of opposite surfaces of said main body; wherein said display device is a sub-display portion arranged on the other surface of said main body, and said camera and said sub-display portion are arranged on said other surface of said main body.

6. The image pick-up device according to claim 1, wherein said first and second bodies are foldably coupled together.

7. The image pick-up device according to claim 1 further comprising:
   an additional camera arranged on said main body, wherein said additional camera is arranged on the first body.

8. The image pick-up device according to claim 7, wherein said additional camera has an optical axis perpendicular to the display surface of said display device, and
   said camera has an optical axis in a direction different from a direction perpendicular to the display surface of the display device.

9. The image pick-up device according to claim 7, wherein said camera and said additional camera are both arranged on the same side of the first body.

10. The image pick-up device according to claim 9, wherein
    one of said camera and said additional camera is arranged on one of the vertically opposite sides of said display device, and has an optical axis inclined toward the other side of said vertically opposite sides, and
    the other of said camera and said additional camera is arranged on one of the laterally opposite sides of said display device, and has an optical axis inclined toward the other side of said laterally opposite sides.

11. An image pick-up device comprising:
    a main body having a first side and a second side, wherein said main body includes a first body having a first surface and a second body having a second surface;
    a camera for taking a picture, wherein said camera has an optical axis and is rigidly fixed to said main body first side and the second surface such that an inclination angle of said optical axis with respect to the second surface does not change; and
    a first display device including a display surface displaying a picture taken by said camera and arranged on said first side and the first surface;
    wherein said optical axis extends in a direction different from a direction perpendicular to said display surface and the optical axis of the camera extends in a direction different from a direction perpendicular to the second surface.

12. The image pick-up device according to claim 11, wherein said first display device includes first and second vertically opposite sides and said camera is arranged on one of said first and second vertically opposite sides, and the optical axis of said camera is inclined toward the other of said first and second vertically opposite sides.

13. The image pick-up device according to claim 11, wherein said first display device includes first and second laterally opposite sides and said camera is arranged on one of said first and second laterally opposite sides, and the optical axis of said camera is inclined toward the other of said first and second laterally opposite sides.

14. The image pick-up device according to claim 11, further comprising a second display device on the second side of said main body.

15. The image pick-up device according to claim 14, wherein said first display device comprises a main display portion and said second display device comprises a sub-display portion.

16. The image pick-up device according to claim 14, wherein said first display device comprises a sub-display portion and said second display device comprises a main display portion.

* * * * *

UNITED STATES PATENT AND TRADEMARK OFFICE
CERTIFICATE OF CORRECTION

PATENT NO. : 7,605,863 B2 Page 1 of 1
APPLICATION NO. : 10/791786
DATED : October 20, 2009
INVENTOR(S) : Oda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1395 days.

Signed and Sealed this

Fifth Day of October, 2010

David J. Kappos
*Director of the United States Patent and Trademark Office*